United States Patent
Bharara et al.

(10) Patent No.: US 11,281,862 B2
(45) Date of Patent: Mar. 22, 2022

(54) SIGNIFICANT CORRELATION FRAMEWORK FOR COMMAND TRANSLATION

(71) Applicant: SAP SE, Walldorf (DE)

(72) Inventors: Aavishkar Bharara, Bangalore (IN); Anbarasu Ayyasami, Coimbatore (IN); Anil Rao Arun, Bangalore (IN); Ramya K S, Bangalore (IN); Deepanshi Katoch, Bhopal (IN); Shrijan Shrivastav, Angul/Odisha (IN); Ankita Prabhu, Kumta (IN); Ashwani Kumar Luhaniwal, Narnaul (IN)

(73) Assignee: SAP SE, Walldorf (DE)

( * ) Notice: Subject to any disclaimer, the term of this patent is extended or adjusted under 35 U.S.C. 154(b) by 217 days.

(21) Appl. No.: 16/457,599

(22) Filed: Jun. 28, 2019

(65) Prior Publication Data
US 2020/0349228 A1 Nov. 5, 2020

(30) Foreign Application Priority Data
May 3, 2019 (IN) .............................. 201911017698

(51) Int. Cl.
*G06F 17/00* (2019.01)
*G06F 40/30* (2020.01)
(Continued)

(52) U.S. Cl.
CPC ............ *G06F 40/30* (2020.01); *G06F 40/205* (2020.01); *G10L 15/1815* (2013.01); *G10L 15/22* (2013.01); *G10L 2015/223* (2013.01)

(58) Field of Classification Search
None
See application file for complete search history.

(56) References Cited

U.S. PATENT DOCUMENTS 9,442,832 B2 9/2016 Bharara
10,181,322 B2 * 1/2019 Hakkani-Tur .......... G10L 15/22
(Continued)

OTHER PUBLICATIONS

"Automate your business processes and improve customer support with AI chatbots," SAP Conversational AI, available at: https://cai.tools.sap/, 6 pages, retrieved Jun. 26, 2019.
(Continued)

*Primary Examiner* — Satwant K Singh
(74) *Attorney, Agent, or Firm* — Klarquist Sparkman, LLP

(57) ABSTRACT

A significant correlation framework is provided herein for translating input commands to intents. The input commands may be natural language commands, received from a variety of input channels, which may be translated to intents or other runtime-bindable execution objects. The significant correlation framework may use interpreter nodes for translating the input commands by calculating the strength of correlation between an input command and an intent. The significant correlation framework may analyze the sequence of intents or the timing of translated intents to enhance the accuracy of the translation. The significant correlation framework may maintain a history of command translations, and may compare current translations against the history to improve accuracy of the translations. The significant correlation framework may switch between a depth-first mapping method and a breadth-first mapping method. Depth-first mapping may translate commands through a single interpreter node. Breadth-first mapping may translate commands using multiple interpreter nodes.

20 Claims, 21 Drawing Sheets

(51) Int. Cl.
  *G06F 40/205* (2020.01)
  *G10L 15/18* (2013.01)
  *G10L 15/22* (2006.01)

(56) References Cited

U.S. PATENT DOCUMENTS

| | | | | |
|---|---|---|---|---|
| 10,304,444 | B2* | 5/2019 | Mathias | G06F 40/35 |
| 10,811,013 | B1* | 10/2020 | Seeker-Walker | G10L 15/26 |
| 2004/0216111 | A1 | 10/2004 | Bharara | |
| 2015/0309561 | A1* | 10/2015 | Stewart | G06F 3/01 |
| | | | | 345/156 |
| 2016/0004629 | A1 | 1/2016 | Bharara | |
| 2017/0039496 | A1 | 2/2017 | Bharara et al. | |
| 2017/0345420 | A1* | 11/2017 | Barnett, Jr. | G10L 15/22 |
| 2018/0232662 | A1* | 8/2018 | Solomon | A61B 5/117 |
| 2019/0172219 | A1 | 6/2019 | Bharara | |
| 2020/0167429 | A1* | 5/2020 | Katz | G06F 17/10 |

OTHER PUBLICATIONS

"Pearson correlation coefficient," Wikipedia, available at: https://en.wikipedia.org/wiki/Pearson_correlation_coefficient, 13 pages, page last edited Jun. 19, 2019.

"Solved: Alexa says Sorry, I'm having trouble understanding you right now. Please try a little later," port135.com, available at: https://port135.com/2017/08/18/solved-alexa-says-sorry-im-having-trouble-understanding-you-right-now-please-try-a-little-later/, 7 pages (Aug. 18, 2017).

"WhatsApp Business API to Enable Messaging App to Finally Start Making Money," Tech2—Technology News, available at: https://www.firstpost.com/tech/news-analysis/whatsapp-business-api-to-enable-messaging-app-to-finally-start-making-money-4873651.html, 4 pages (Aug. 2, 2018).

* cited by examiner

702 →

Correlation Coefficient Formula

Where:
- n = Total number of commands
- x = List of predefined user actions or commands
- y = User entered actions or commands
- r = Coefficient value

704 →

SIGNIFICANT CORRELATION FRAMEWORK FOR COMMAND TRANSLATION

CROSS REFERENCE TO RELATED APPLICATION

This application claims priority to India Provisional Patent Application No. 201911017698, filed May 3, 2019, which is hereby incorporated by reference herein.

FIELD

The present disclosure generally relates to system interfaces and command or input translation. Particular implementations relate to natural language process, intent determination and processing, and systems and methods for user command translation and interpretation, such as for determining and executing processing commands.

BACKGROUND

Digital assistants and cognitive technologies are increasingly used to connect users with software, such as data processing systems. While such technology is intended to provide users with a more natural software interface, such digital assistants often can only accurately or meaningfully respond to very specific requests, or requests provided in a very specific way. Such interfaces generally do not respond well to natural human variation or minor errors. Thus, there is room for improvement.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method for executing an input command is provided herein. An input command may be received. An intent for the input command may be determined. A correlation score between the input command and the intent may be calculated. Responsive to determining that the correlation score meets a threshold, the intent may be provided for execution.

A method for generating an executable command tree is provided herein. A series of input commands may be received. The series of input commands may be parsed into separate command statements. An interpreter node applicable to the series of input commands may be identified. A command tree may be generated based on the separate command statements. Generating the command tree may include determining an intent for a given command statement based on the interpreter node, calculating a confidence score for the intent and the given command statement, and storing the intent and the confidence score in a node of the command tree. Responsive to the confidence score, another interpreter node may be selected. The command tree may be generated based on the another interpreter node.

A method of command mapping is provided herein. A series of input commands may be received. The series of input commands may be parsed into separate command statements. An interpreter node applicable to the series of input commands may be identified from a plurality of interpreter nodes. A command tree having the separate command statements stored in respective nodes may be generated. A depth-first mapping of the command tree to intents may be performed based on the interpreter node. The depth-first mapping may include determining an intent for a given command statement based on the interpreter node, for the respective nodes of the command tree, calculating a confidence score for the intent and the given command statement, for the respective nodes of the command tree, and storing the intent and the confidence score in a node of the command tree having the given command statement, for the respective nodes of the command tree. Responsive to determining that the confidence score meets a threshold, one or more intents in the command tree may be provided.

The foregoing and other objects, features, and advantages of the invention will become more apparent from the following detailed description, which proceeds with reference to the accompanying figures.

DETAILED DESCRIPTION

Figure 1A:
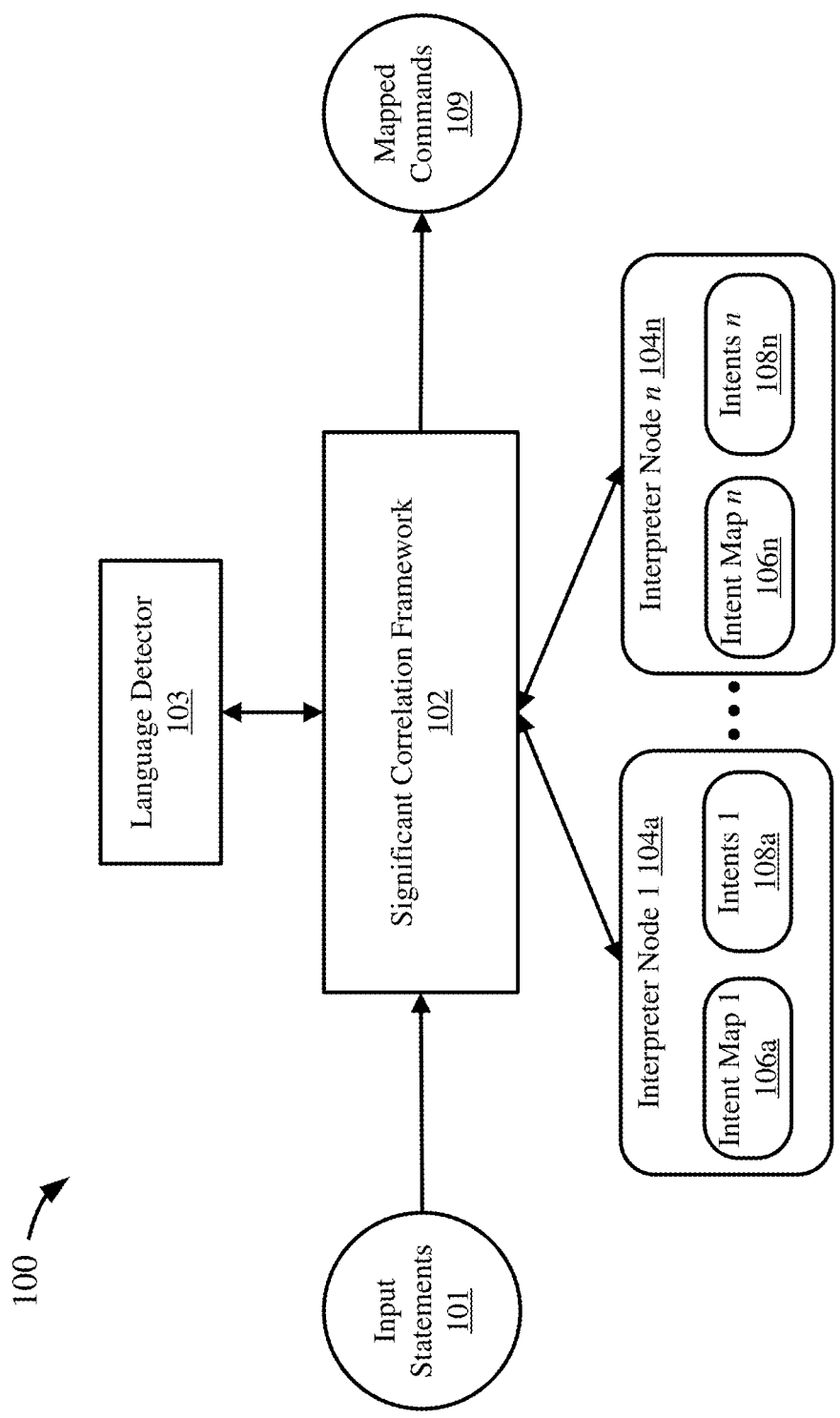
FIG. 1A is a general architecture diagram of a significant correlation framework.

A variety of examples are provided herein to illustrate the disclosed technologies. The technologies from any example can be combined with the technologies described in any one or more of the other examples to achieve the scope and spirit of the disclosed technologies as embodied in the claims, beyond the explicit descriptions provided herein. Further, the components described within the examples herein may be combined or recombined as well, as understood by one skilled in the art, to achieve the scope and spirit of the claims.

Example 1—Significant Correlation Framework Overview

A significant correlation framework for mapping a series of commands to a command tree providing executable commands to a processing system is provided herein. Advances in cognitive technologies are allowing users to direct software applications or systems through dialogues, rather than traditional user interfaces. For example, users may provide command statements, or input statements, such as "show me movie times" or "get my work orders" to a command translator, which may initiate the requested functionality at the appropriate software system.

A command translator may be a software application that transforms a user command, such as in a natural language, to a known system command that can be executed or otherwise have the requested task performed. Examples of a command translator are Recast.AI from SAP SE, of Walldorf, Germany or Alexa from Amazon.com, Inc., of Seattle, Wash. In some embodiments, the significant correlation framework disclosed herein may be a command translator itself, while in other embodiments the significant correlation framework may extend or supplement a command translator, such as by providing command translation error handling or fallback functionality.

A command translator may receive user commands (e.g. input commands or statements) from a variety of channels. A channel may be a mode of communication. Generally, input channels are either voice-based or text-based. A voice-based input channel may be a mobile device into which spoken commands can be provided, such as to a voice-activated command translator like Siri from Apple, Inc. of Cupertino, Calif. Text-based channels may include various software applications like Facebook or WhatsApp from Facebook, Inc. of Menlo Park, Calif., Skype from Microsoft, Inc. of Redmond, Wash., or Telegram from Telegram Messenger LLP of London, United Kingdom. The significant correlation framework may receive user commands through such input channels, or from a command translator which may receive user commands through such input channels.

The significant correlation framework may then map the input statement (or statements) to an intent. An intent may be a pre-defined software object that can be dynamically bound at runtime to a particular process, function call, service, data object, or other functionality in the software system to which the command is directed. Command translation generally includes mapping the input user request to an intent, and may further include binding the intent to the executed function at the target processing software application or system.

As part of command translation (e.g. intent mapping), the significant correlation framework may calculate a correlation or confidence score for a given mapping. The confidence score may indicate the strength of the correlation between the input statement and the intent, such as how often similar input statements have been mapped to that intent. The significant correlation framework may then utilize the confidence score to make decisions regarding the mapping, such as whether to pursue another mapping or use the mapped intent.

Further, the significant correlation framework may store a history of its mappings, which may include confidence scores in some cases. The history of command translation mappings may be used by the significant correlation framework to improve future command translations or to adjust how it maps certain input statements over time, to account for changes in users' statements and sought functionality.

Command translation functionality may be provided in interfaces for database management software, ERP software, data warehouses, analytics software, or other processing software systems. The significant correlation framework and related technology disclosed herein may be used in conjunction with other command translation systems, such as Recast.AI™ (SAP Conversational AI) technologies from SAP SE, of Walldorf, Germany.

Example 2—Command Translation Via Significant Correlation Framework

FIG. 1A is a general architecture diagram 100 for a significant correlation framework. A significant correlation framework 102 may receive one or more input statements 101. The input statements 101 are generally commands from a user directed to a software or other computing system requesting a particular action (e.g. "get me current movies; get me movie times," or "open statistical analysis A"). The input statements 101 may be in human-intelligible form, such as spoken commands or written (e.g. typed) commands, such as may be received from a user interface. In some cases, the input statements 101 may be separate or discrete statements, which may be unrelated commands. In some cases, the input statements 101 may be a series of statements, such as a related set of commands. The input statements 101 may be provided to the significant correlation framework 102 together as a set, or separately in series.

The significant correlation framework 102 may receive the input statements 101 and translate the input statements into mapped commands 109. The significant correlation framework 102 may access one or more interpreter nodes 104a-n for use in translating the input statements 101 to the mapped commands 109. The interpreter nodes 104a-n may be data objects or data structures with data for translating or interpreting natural-language inputs. For example, the interpreter nodes 104a-n may be chatbots or other developed natural language processing data stores. The interpreter nodes 104a-n may each have a set of intents 108a-n which list the intents recognized by, or otherwise available through, the interpreter node. An intent may be an identifier or messaging object for use in binding a command to a runtime function or object (e.g. a translation identifier between an input command and a function or service call in the software). The interpreter nodes 104a-n may also have intent maps 106a-n, which may provide data or logic for translating from an input statement or command to an intent (e.g. a set of text expressions that match a given intent).

The significant correlation framework 102 may access a language detector 103 for detecting the language of the input statements 101. Processing of the input statements 101, such as parsing or identifying an appropriate interpreter node 104a-n, may be dependent on the language of the input statements, such as may be determined by the language detector 103. The language detector 103 may also provide natural language processing or other data for use in translating the input statements 101, such as slang identification or translation. In some embodiments, the language detector 103 may be integrated with the significant correlation framework 102.

The mapped commands 109 may be a set of intents as mapped to the input statements 101 by the significant correlation framework 102 from one or more of the interpreter nodes 104a-n. The mapped commands 109 may be a command tree of the intents, or another data structure(s) or variable(s) with the intents. Generally, the intents have an order or sequence in which they should be executed (e.g. "login" then "retrieve records"), which may be represented in the command tree or other data structure. However, in some cases the intents may not have a particular sequence and may be provide as an arbitrary set. In some embodiments, the mapped commands 109 may be the actual function or service calls to be made in a computing system, as determined based on the intents mapped by the significant correlation framework.

Example 3—Significant Correlation Framework Architecture

Figure 1B:
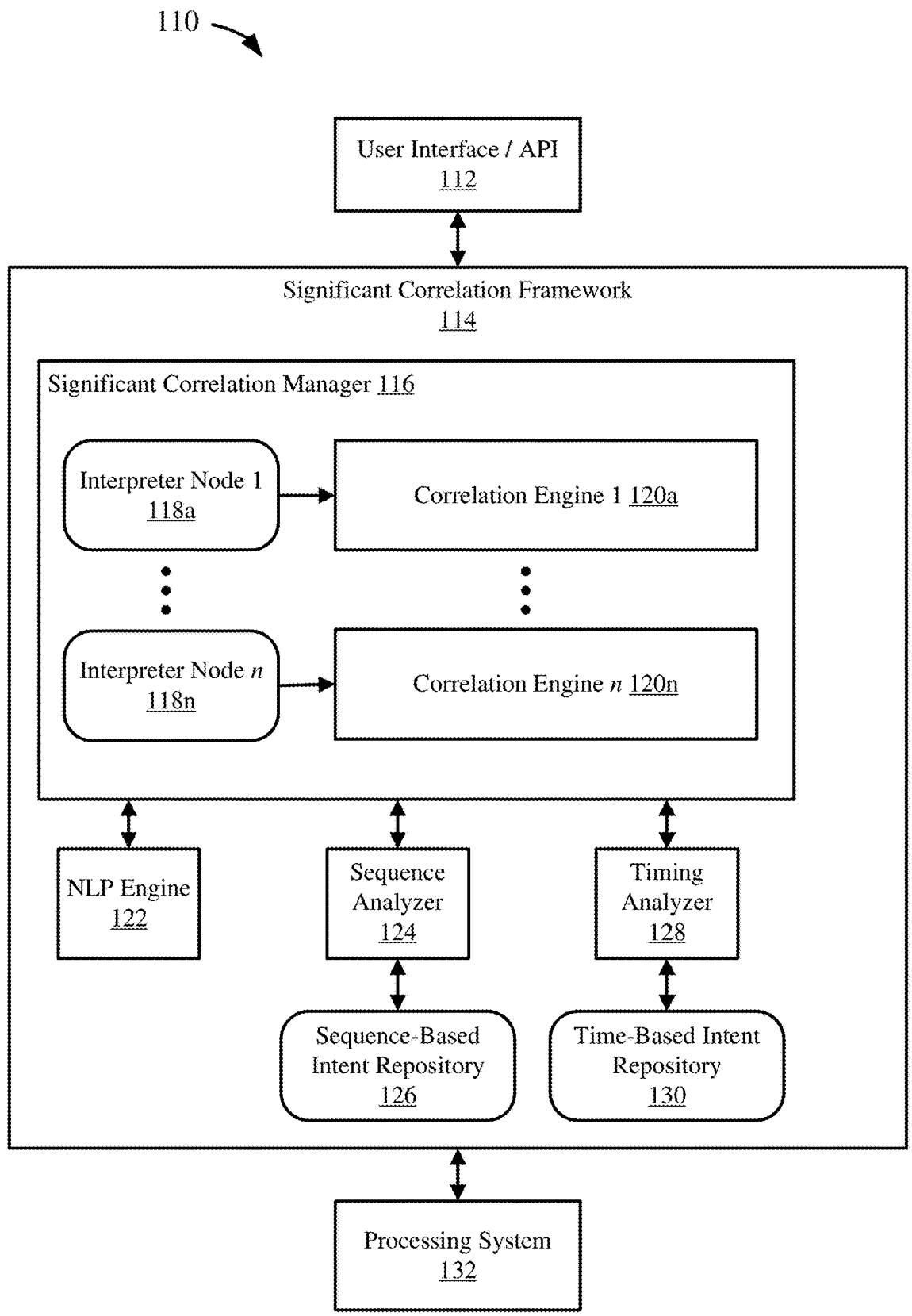
FIG. 1B is a detailed architecture diagram of a significant correlation framework.

FIG. 1B is a detailed architecture diagram 110 of a significant correlation framework 114. The significant correlation framework 114 may be accessed through a user interface/API 112. The user interface/API 112 may allow the significant correlation framework 114 to receive command translation requests from a communication channel, such as a voice program or messaging program, or from another command translator, such as Recast.AI (e.g. when the significant correlation framework functions as error handling or fallback logic).

The significant correlation framework 114 may have a significant correlation manager 116, an NLP engine 122, a sequence analyzer 124, a sequence-based intent repository 126, a timing analyzer 128 and a time-based intent repository 130.

The significant correlation manager 116 may have one or more interpreter nodes 118a-n. The interpreter nodes 118a-n may be the interpreter nodes 104a-n shown in FIG. 1A, or may be data received from the interpreter nodes 104a-n shown in FIG. 1A. Thus, in some embodiments, the significant correlation manager 116 may access the interpreter nodes 118a-n, which may be available or stored outside the significant correlation manager 116 (e.g. at a command translator or other software service).

The significant correlation manager 116 may have one or more correlation engines 120a-n. The correlation engines 120a-n may translate an input statement to an intent or mapped command, as described herein. Generally, a particular correlation engine 120a-n may be associated with a particular interpreter node 118a-n, and so the command translation functionality provided by the particular correlation engine may be based on the associated interpreter node. For example, correlation engine 1 120a may be associated with interpreter node 1 118a, and so may use data from interpreter node 1 to map an input statement to an intent (e.g. a series of input statements or commands to a command tree, as described herein).

The significant correlation manager 116 may manage the associations between the interpreter nodes 118a-n and the correlation engines 120a-n. Additionally, the significant correlation manager 116 may manage or identify default correlation engines for cases where a particular interpreter node is requested or identified for use, but does not have a specific associated correlation engine.

The significant correlation engine 116 may manage the selection of interpreter nodes 118a-n and associated correlation engines 120a-n. The selection may be made based on a user input (which may include input as a request from a command translator or other system), one or more settings or characteristics for the significant correlation framework 114, or a hierarchy or other interrelationship between the interpreter nodes 118a-n or correlation engines 120a-n.

The significant correlation manager 116 (or the correlation engines 120a-n within the significant correlation manager) may communicate with the NLP engine 122. The NLP engine 122 may provide natural language process functionality to the significant correlation manager 116, such as for parsing input statements or fuzzy logic for identifying similar matching input statements compared to expressions or other textual data (e.g. from the interpreter nodes 118a-n).

The significant correlation manager 116 (or the correlation engines 120a-n within the significant correlation manager) may communicate with the sequence analyzer 124. The sequence analyzer 124 may provide sequence analysis of a series of intents (e.g. as determined by a correlation engine 120a-n) functionality to the significant correlation manager 116, as described herein. The sequence analyzer 124 may compare a sequence of intents determined by one or more of the correlation engines 120a-n against previous intent sequences available in the sequence-based intent repository 126.

The significant correlation manager 116 (or the correlation engines 120a-n within the significant correlation manager) may communicate with the timing analyzer 128. The timing analyzer 128 may provide timing analysis of intents (e.g. as determined by a correlation engine 120a-n) functionality to the significant correlation manager 116, as described herein. The timing analyzer 128 may compare the intents determined by one or more of the correlation engines 120a-n against the history of usage of the intents available in the time-based intent repository 130. In some cases, this may include comparing the mapping of the input statement to the intent against the history of similar mappings. Thus, the time analyzer 128 may account for changes over time of a user's intent for a particular input statement. For example, the input statement "get purchases" may at one point in time be mapped to the intent "orders" and later in time be mapped to the intent "receipts."

The significant correlation framework 114 may store successful command translations in the sequence-based intent repository 126 (e.g. the sequence of mapped intents) and, alternatively or additionally, in the time-based intent repository 130 (e.g. the intents mapped and the corresponding date/time of usage).

The significant correlation framework 114 may communicate with a processing system 132. The processing system 132 may be a software system for which the input statements are meant to direct or otherwise provide instruction to, such as a database system (e.g. generally providing data storage and retrieval) or an analytics system (e.g. generally providing data analysis or data visualization). The significant correlation framework 114 may provide the translated commands (e.g. command tree, or set of intents) to the processing system 132 directly or through a network or service API (e.g. software as a service).

Figure 1C:
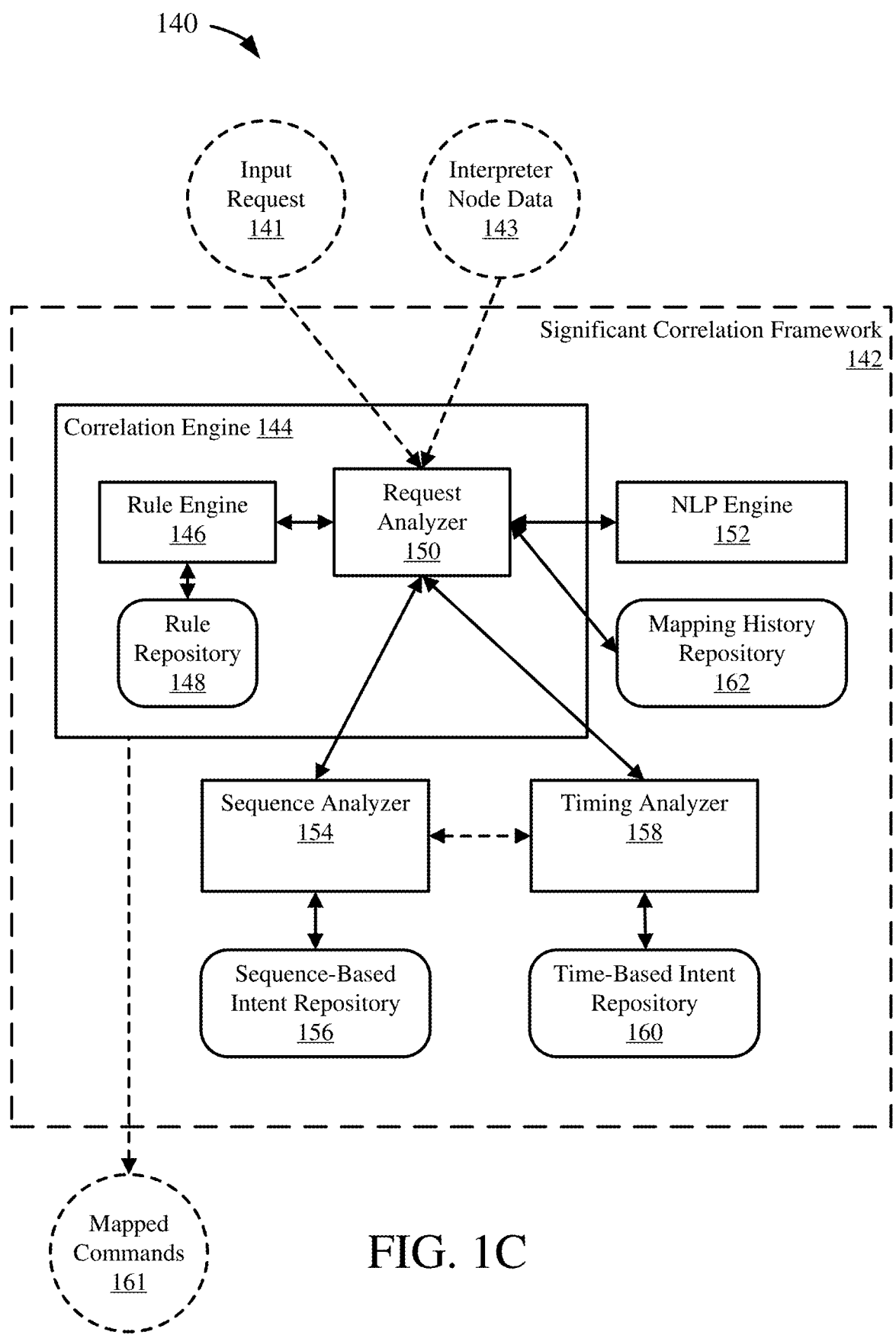
FIG. 1C is an architecture diagram of a correlation engine within a significant correlation framework.

FIG. 1C is an architecture diagram 140 of a correlation engine 144 within a significant correlation framework 142, as similarly shown in FIGS. 1A-B. The correlation engine 144 may have a request analyzer 150, a rule engine 146, and a rule repository 148.

The correlation engine 144 may receive the input request or statements 141 (e.g. the input statements 101 shown in FIG. 1A) and the interpreter node data 143 (e.g. from the interpreter nodes shown in FIGS. 1A-B), such as at the request analyzer 150. The correlation engine 144 may provide the mapped commands 161 (e.g. the mapped commands 109 shown in FIG. 1A) as the command translation result.

The request analyzer 150 may provide command translation functionality, as described herein, to translate one or more received or accessed input statements to intents or mapped commands. The command translation functionality provided by the request analyzer 150 may include text analysis of the input statements from the input request 141, which may be facilitated by the NLP engine 152. The text analysis may include parsing the input statements to identify separate input commands or phrases. The text analysis may include comparing the parsed input statements to the interpreter node data 143 to map the input statements to intents from the interpreter node data, which may include comparing the input statements against a set of expressions for the various intents.

The request analyzer 150 may perform the command translation and text analysis based on one or more rules facilitated by the rule engine 146. The rule engine 146 may apply one or more rules, which may be obtained from a rule repository 148, to translate the input statements to mapped commands. The rules, such as in the rule repository 148, may be arranged in a hierarchy, and so may be applied in a hierarchical manner, such as by the rule engine 146. The rule engine 146 may define, such as through the rules stored in the rule repository 148, how the input statements are parsed or how the input statements are mapped, such as to an intent. Generally, the rule engine 146 and rule repository 148 are specific to a given correlation engine 144, but in some cases, a rule engine or rule repository may be shared by multiple correlation engines (e.g. such as for default rules handling otherwise undefined scenarios).

As part of the command translation functionality, the correlation engine 144 may generate a correlation or confidence score for an input statement-to-intent mapping. In some embodiments, the request analyzer 150 may generate the confidence score.

The request analyzer 150 may communicate with a sequence analyzer 154 and a sequence-based intent repository (e.g. the sequence analyzer 124 with the sequence-based intent repository 126 shown in FIG. 1B) for intent sequence analysis as described herein. The request analyzer 150 may communicate with a timing analyzer 158 and a time-based intent repository 160 (e.g. the timing analyzer 128 with the time-based intent repository 130 shown in FIG. 1B) for intent timing analysis as described herein. In some embodiments, the sequence analyzer 154 and the timing analyzer 158 may communicate as well, such as to pass an analysis request.

The request analyzer 150 (or generally the correlation engine 144) may access a mapping history repository 162 in the significant correlation framework 142. The mapping history repository 162 may maintain data on previously successful input statement-to-intent mappings, such as the parsed input statement itself and the mapped intent. In some embodiments, the mapping history repository 162 may be integrated with the sequence-based intent repository 156 or the time-based intent repository 160 (or both). The mapping history repository 162 may be used to facilitate command translation as described herein, such as by providing potential mappings or confirming determined mappings. Further, the request analyzer 150 (or generally the correlation engine 144) may store successful mappings in the mapping history repository 162, and, additionally or alternatively, in the sequence-based intent repository 156 or the time-based intent repository 160 (or both). By storing successful mappings and using the previously successful mappings in future command translation, the significant correlation framework 142 may gradually adapt over time to provide more accurate command translation (e.g. intent mappings to input statements). Further, the significant correlation framework 142 may also adapt to changes in user intent for similar expressions, thus reducing the amount of redevelopment of the significant correlation framework by automatically adjusting based on the stored previous successful mappings.

Example 4—Significant Correlation Framework for Translation Error Handling

Figure 2:
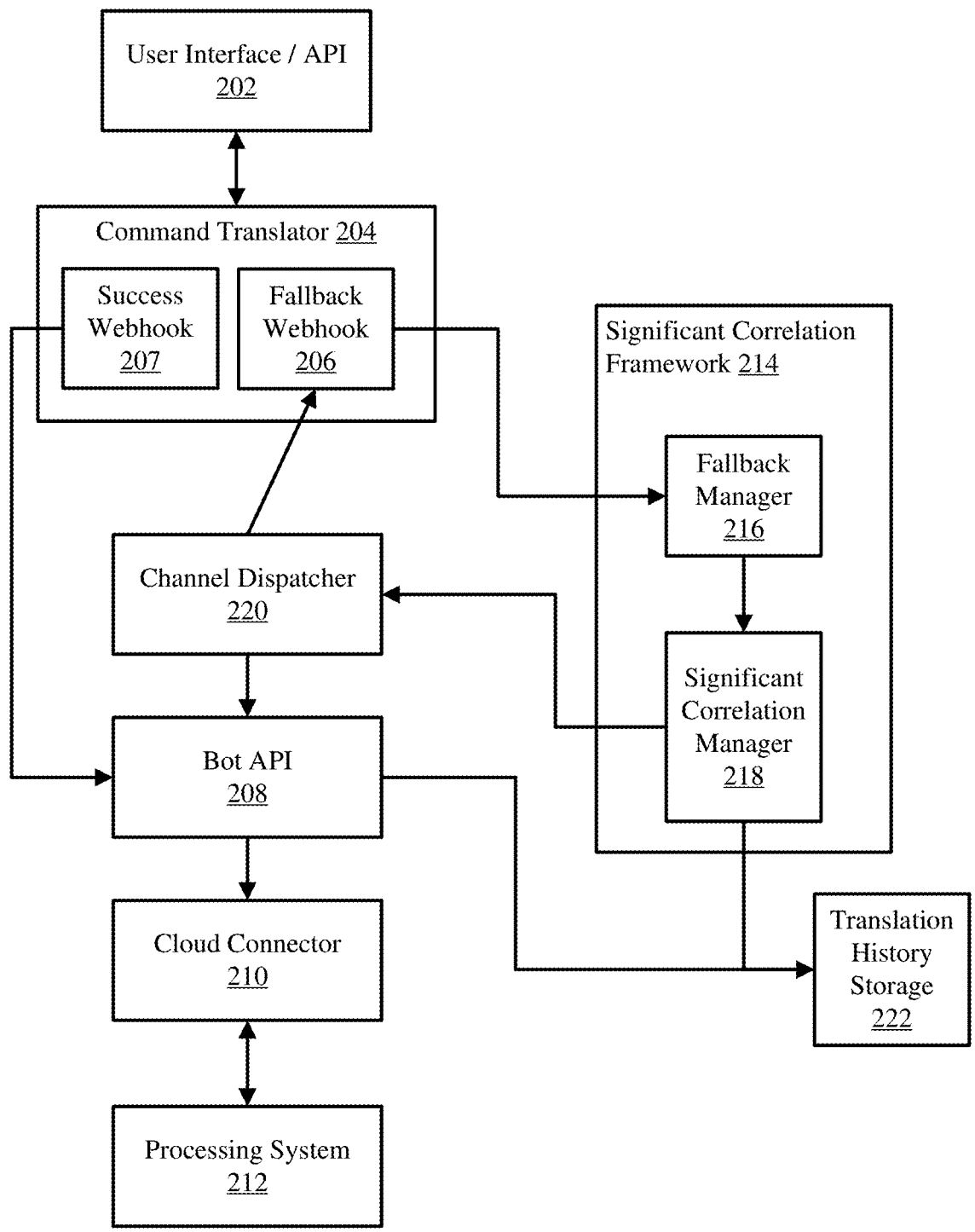
FIG. 2 is an architecture diagram of a significant correlation framework as a fallback processor for a command translator.

FIG. 2 is an architecture diagram 200 of a significant correlation framework as a fallback processor for a command translator. In some embodiments, the significant correlation framework 214, as described herein, may be implemented to act as "error" or "failure" handling. In such embodiments, the significant correlation framework 214 may extend or supplement the functionality of a command translator 204, such as when the command translator cannot map the input statement to a command, or cannot find a sufficiently good or effective mapping (e.g. a mapping that meets a threshold for correctness or accuracy).

A command translator 204 may access a user interface/API 202 for receiving input commands from a user via one or more channels, such as voice or text interfaces. In some embodiments, the user interface/API 202 may be integrated with the command translator 204. Commands received via the user interface/API 202 are generally requests to execute functionality of the processing system 212.

The command translator 204 may attempt to translate an input command to an intent for use in executing the requested functionality of the processing system 212. The command translator 204 may have a fallback webhook 206 for handling errors or translation attempts which are not successful.

The fallback webhook 206, when it detects or receives a command translation failure, may access a significant correlation framework 214. The fallback webhook 206 may access the significant correlation framework 214 via a fallback manager 216. The fallback manager 216 may receive command translation data, such as one or more input statements, previous executed commands, parsing information, interpreter node information, error codes, and so on, from the command translator 204 via the fallback webhook 206. The fallback manager 216 may prepare the received command translation data and provide it to the significant correlation manager 218 for translating the failed input statements as described herein.

The significant correlation manager 218 may provide its results to a channel dispatcher 220. The channel dispatcher 220 may determine if the significant correlation framework 214 was successful in translating the failed input command. If the significant correlation framework 214 was not successful, the channel dispatcher 220 may provide the further failure results back to the command translator 204, such as via the fallback webhook 206. The command translator may push the error information back to the user interface/API 202, or may provide updated information (e.g. a new input statement or clarification statement such as may have been received during processing) to the significant correlation framework 214.

If the significant correlation framework 214 was successful, the channel dispatcher may provide the mapped commands or intents received from the significant correlation framework to a Bot API 208. The command translator 204 may similarly provide mapped commands or intents to the Bot API 208 when successful, such as via the success webhook 207, and accordingly may skip the significant correlation framework 214.

The Bot API 208 may be an interface for converting intents to an API of the processing system 212. The Bot API 208 may send the appropriate API requests based on the translated intents to the processing system 212, which may then perform the requested functionality. The Bot API 208 may access the processing system 212 across a network, or the cloud, through a cloud connector 210. The processing system 212 may return results of the requested functionality to the cloud connector 210, which may provide the results back to the user interface/API 202, in some cases directly and in other cases through the Bot API 208 and/or the command translator 204.

In some embodiments, the channel dispatcher 220, the Bot API 208, and the cloud connector 210 may be integrated together (in various combinations thereof). Additionally or alternatively, the channel dispatcher 220, the Bot API 208, and the cloud connector 210, or some integrated combination thereof, may be integrated with the command translator 204.

A translation history storage 222 may receive and store command translation results from the significant correlation manager 218. The translation results stored may include successful or failed translation results, and the stored results may be indicated as either successes or failures. Further, results from the command translator 204 may be similarly stored in the translation history storage 222. For example, the command translator may send results to the Bot API 208, such as through the success webhook 207, for storage. The Bot API 208 may then provide the results from the command translator 204 to the translation history storage 222. The translation history storage 222 may be integrated with the significant correlation framework 214, or, in other embodiments, may be accessible by the significant correlation framework for use in command translation as described herein.

Example 5—Operation Modes

Figure 3:
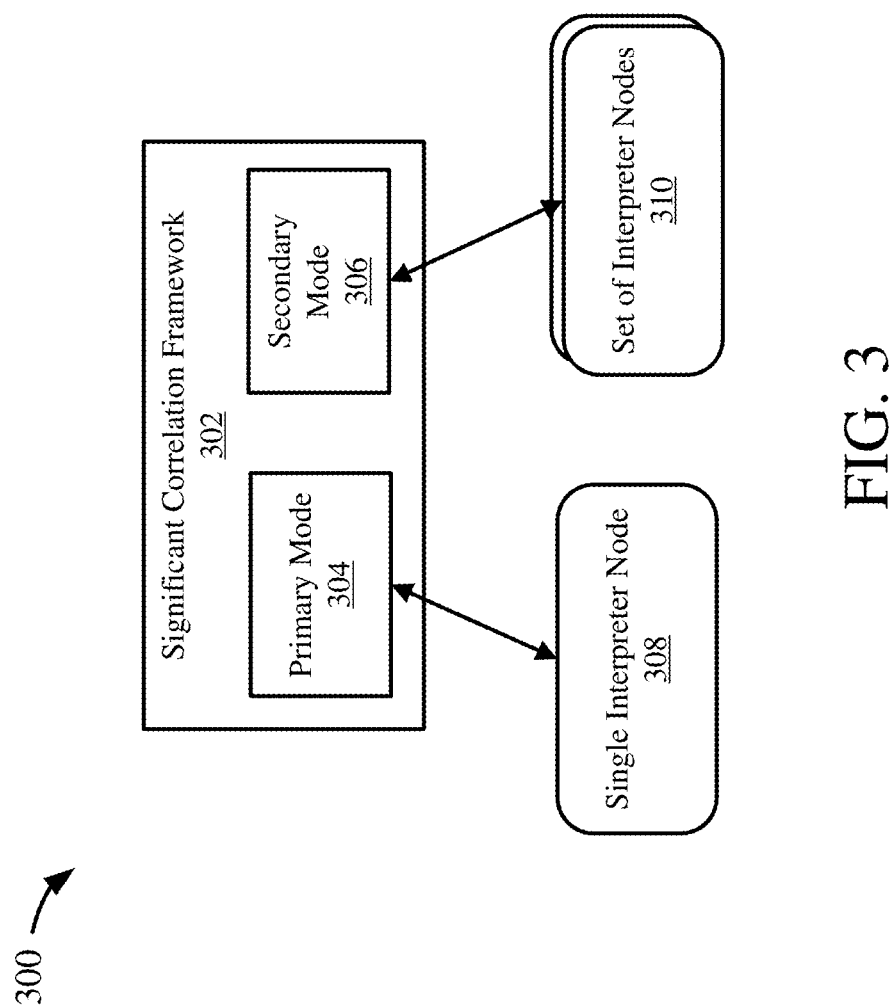
FIG. 3 is a schematic diagram of modes of a significant correlation framework.

FIG. 3 is a schematic diagram 300 of modes of a significant correlation framework. A significant correlation framework 302 may have multiple modes 304, 306 which may determine the process used for translating or mapping an input statement or command to an output command, as described herein. The significant correlation framework 302 may have a primary mode 304, which may function as the first or main mode executed, and a secondary mode 306, which may function as a back-up or alternative mode to the primary mode. For example, if the primary mode 304 fails to successfully map the input commands, the secondary mode 306 may be initiated to map the input commands. In some embodiments, one or more settings or rules may be available in the significant correlation framework 302 for determining which mode 304, 306 to use, which order to use the modes in, or triggers for switching between the modes (or some combination thereof). For example, for an input command from a user, the user's user-type may indicate which mode 304, 306 to use (e.g. a technician may default to using the primary mode, while an administrator may default to using the secondary mode). In some embodiments, such settings or rules may be user-configurable. In some embodiments, a translation or mapping request (e.g. input request) may include an indicator or other field for identifying which mode 304, 306 to use.

The primary mode 304 may access a single interpreter node 308 for mapping an input statement to a software command, as described herein. The primary mode 304 may include a depth-first analysis of the one or more input statements based on the interpreter node 308. The depth-first analysis may be similar to the process 420 shown in FIG. 4B. If multiple input statements are provided, or otherwise available to the significant correlation framework, the primary mode 304 may map all the input statements to a command tree, as described herein, which may be accomplished through a depth-first analysis. The interpreter node 308 used by the primary mode 304 may be an interpreter node selected or identified by the user. Alternatively or additionally, the interpreter node 308 may be the previous interpreter node accessed by the user or the primary mode 304. Alternatively or additionally, the interpreter node 308 may be a predefined interpreter node for the primary mode 304 or the significant correlation framework 302. Alternatively or additionally, the interpreter node 308 may be selected based on one or more settings or rules.

The secondary mode 306 may access a set of interpreter nodes 310 for mapping an input statement to a software command, as described herein. The primary mode 304 may include a breadth-first analysis of the one or more input statements based on the set of interpreter nodes 310. The breadth-first analysis may be similar to the process 440 shown in FIG. 4C. The breadth-first analysis may include mapping an input statement or statements based on a first interpreter node from the set of interpreter nodes 310 and, if the mapping fails (e.g. the correlation or confidence score drops below a threshold), switching to another node from the set of interpreter nodes rather than continue the mapping under the current node. In some embodiments, the secondary mode 306 may cycle through interpreter nodes individually from the set of interpreter nodes 310 attempting to find a mapping to the input command until a suitable mapping is found (e.g. meets a correlation or confidence threshold). In some embodiments, the secondary mode 306 may analyze input commands against some or all of the nodes in the set of interpreter nodes 310 and select a preferred mapping from the results (e.g. a mapping with the highest correlation or confidence score). The set of interpreter nodes 310 may include one or more interpreter nodes accessible to the significant correlation framework 302. In some cases, the set of interpreter nodes 310 may exclude the single interpreter node 308, such as when the single interpreter node 308 has already been used in analysis (e.g. under the primary mode 304). In some embodiments, the set of interpreter nodes 310 may include interpreter nodes selected by the significant correlation framework 302 based on one or more criteria (e.g. activation of the node, previous success with the node, previous use by the user, etc.).

Example 6—Process for Command Translation

Figure 4A:
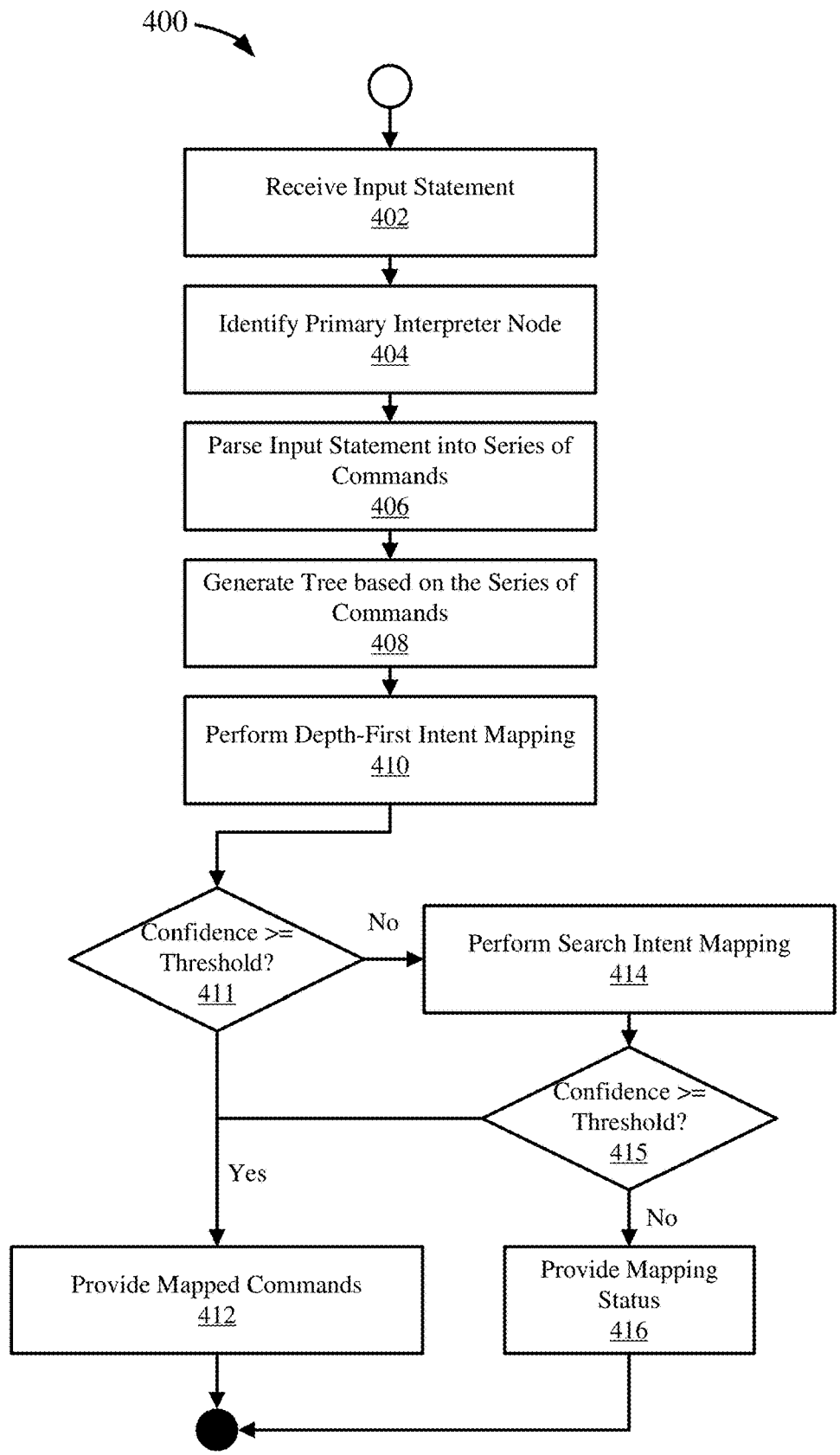
FIG. 4A is a flowchart illustrating a process for command translation using significant correlation mapping.

FIG. 4A is a flowchart illustrating a process 400 for command translation using significant correlation mapping. The process 400 generally maps one or more input statements to one or more commands for execution at or by a system or software application. In some embodiments, the process 400 may map a series of flat commands or input statements to a command tree or set of mapped commands. The process 400 may be implemented by a significant correlation framework, as described herein.

One or more input statements may be received at 402. The input statements may be received from a user interface, which may be via one or more channels, or from a command translator or other command processing system. An interpreter node identifier may be provided along with the input statements. The interpreter node identifier may indicate a preferred interpreter node to use, or, alternatively or additionally, indicate an interpreter node already used, such as by a command translator. One or more previous input statements or mapped commands (or both) may be provided along with the input statements. In such cases, the previous input statements or mapped commands may be considered part of the same command sequence as analyzed by the process 400. Other parameters may be received with the input statements as well, such as a language indicator (which may alternatively be retrieved based on the input statements), a mode indicator to indicate which mode to use, or user data (e.g. user name, user-type, etc.).

A primary interpreter node may be identified or selected at 404. In some cases, the primary interpreter node may be identified based on an interpreter node identifier received at 402. Alternatively or additionally, the primary interpreter node may be identified based on an input statement received at 402. For example, an input statement may include the name of an interpreter node. Alternatively or additionally, the primary interpreter node may be identified based on the user providing the input statements. Alternatively or additionally, the primary interpreter node may be identified based on the input channel through which the input statements were provided by the user (e.g. which application or user interface was used).

The input statements may be parsed at 406. Parsing the input statements at 406 may result in a series of one or more commands requested. The input statements may be parsed to identify separate commands or requests within a single input statement. Further, the input statements may be parsed into separate sentences, phrases, or words, which may be accomplished through natural language processing and may be based on an identified language of the input statements. In some embodiments, parsing at 406 may include tokenization of the input statements.

A command tree may be generated at 408 based on the parsed input statements from step 406. In some embodiments, the command tree may be a tree data structure, with the parsed series of commands from step 406 at the tree nodes. In other embodiments, the command tree may be another data structure with the parsed series of commands, such as a linked list of command objects or variables, an array, a string with command or token separators, and so on. The command tree may indicate a sequence or hierarchy between the commands or parsed statements, or other relationships between the statements, such as if one statement provides further details or instructions about another statement. In some embodiments, the command tree may be generated using previously provided commands as well, such as the last command processed, or the last two commands processed, or all commands for an identified session of a user, and so on.

Depth-first intent mapping may be performed at 410. Generally, the depth-first intent mapping at 410 maps the parsed series of commands in the command tree to intents available in the primary interpreter node identified at 404. The mapped intents may later be used to determine specific function calls or services to execute at a software system. The depth-first intent mapping at 410 may map each node of the command tree, through the full depth of the command tree. The depth-first intent mapping at 410 may include calculating one or more confidence scores. In some embodiments, a single confidence score may be calculated for all intent mappings in the command tree. In other embodiments, a separate confidence score may be calculated for each of the separate intent mappings. The confidence score may reflect a strength of correlation between the parsed statement and the corresponding mapped intent. The depth-first intent mapping at 410 may include, or be similar to, the process 420 shown in FIG. 4B. In some embodiments, the depth-first intent mapping at 410 may include, or be similar to, the primary mode 304 shown in FIG. 3.

Additionally or alternatively, the depth-first intent mapping at 410 may analyze the sequence of the mapped intents against the primary interpreter node or a sequence repository storing other known intent sequences to determine or adjust the confidence score of the mapping. Additionally or alternatively, the depth-first intent mapping at 410 may analyze the timing of the mapped intents against the primary interpreter node or a timing repository storing other known intent timings to determine or adjust the confidence score of the mapping.

The confidence score(s) generated as part of the depth-first intent mapping at 410 may be compared to a threshold value at 411. Comparing the confidence score may include comparing a numeric confidence score value to a numeric threshold value (e.g. a number or percentage), or testing a binary condition (e.g. true/false, pass/fail), or comparing a confidence score value to a set of possible values (e.g. "high," "medium," "low"). Comparing the confidence score to a threshold may include determining if the confidence score exceeds or meets the threshold, such as for a numeric confidence score if the score is greater than or equal to the threshold, or if the confidence score fails the threshold, such as for a numeric confidence score if the score is less than the threshold.

If the confidence score passes the threshold ("yes" at 411), then the mapped commands may be provided at 412. Providing the mapped commands at 412 may include providing the command tree with the mapped intents. In some embodiments, the mapped intents may be provided at 412 without the parsed commands or confidence scores. In such embodiments, the mapped intents may be provided in the command tree structure, or in a sequence or other order or organization specific to the mapped intents (e.g. an order in which the actions corresponding to the intents should be executed). In some cases, the mapped intents may be provided in no particular sequence, hierarchy, or organization. The mapped commands may be provided to an interface or other API which may be able to execute particular function or service calls based on the mapped intents. In this way, particular software or system functionality may be invoked by the input statements received at 402 via the process 400.

If the confidence score does not pass the threshold ("no" at 411), then search intent mapping may be performed at 414. The search intent mapping at 414 may include identifying one or more available interpreter nodes other than the primary interpreter node identified at 404. The search intent mapping at 414 may be similar to a breadth-first intent mapping in some embodiments. Generally, the search intent mapping at 414 maps the parsed series of commands in the command tree to intents available in one or more interpreter nodes. The mapped intents may later be used to determine specific function calls or services to execute at a software system. In some embodiments, the search intent mapping at 414 may map each node of the command tree to an intent in one of the other available interpreter nodes, across each level of the command tree compared to one or more other available interpreter nodes. In other embodiments, the search mapping at 414 may map the nodes of the command tree to intents based on one of the other available interpreter nodes and, if the mappings do not reach the confidence threshold, proceed to map the command tree based on another of the other available interpreter nodes (this may be repeated until all the commands are satisfactorily mapped, or no further interpreter nodes are available).

In some embodiments, the search mapping at 414 may include selecting another interpreter node and performing command translation, as described herein, based on the newly-selected interpreter node.

The search intent mapping at 414 may include calculating one or more confidence scores, similar to the depth-first mapping at 410. The search intent mapping at 414 may include, or be similar to, the process 440 shown in FIG. 4C. In some embodiments, the search intent mapping at 414 may include, or be similar to, the secondary mode 306 shown in FIG. 3.

Additionally or alternatively, the search intent mapping at 414 may analyze the sequence of the mapped intents against the one or more of the other available interpreter nodes used in the breadth-first mapping, or a sequence repository storing other known intent sequences to determine or adjust the confidence score of the mapping. Additionally or alternatively, the search intent mapping at 414 may analyze the timing of the mapped intents against the one or more of the other available interpreter nodes used in the breadth-first mapping, or a timing repository storing other known timings to determine or adjust the confidence score of the mapping.

The confidence score(s) generated as part of the search intent mapping at 414 may be compared to a threshold value at 415, which may be similar to confidence score comparison at 411.

If the confidence score passes the threshold ("yes" at 415), then the mapped commands may be provided at 412, as described herein.

If the confidence score does not pass the threshold ("no" at 415), then mapping status may be provided at 416. Providing the mapping status at 416 may include generating a message indicating that the input statement was unable to be processed (e.g. translated into a command, or is an unrecognized command). For example, an error message or error code may be generated at 416. The mapping status may be provided at 416 back to a user, such as via the input channel used to provide the input statements, or may be provided to the system initiating the process 400.

Example 7—Depth-First Process for Command Translation

Figure 4B:
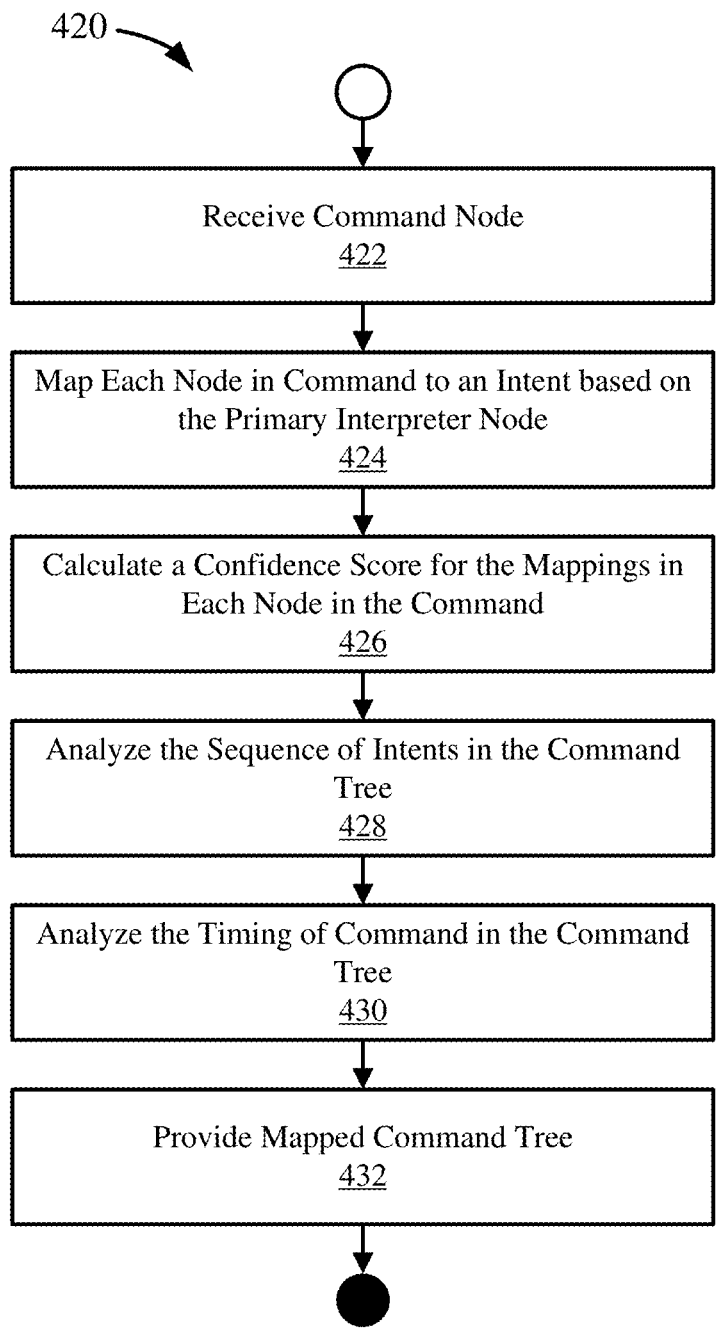
FIG. 4B is a flowchart illustrating a process for command translation using depth-first significant correlation mapping.

FIG. 4B is a flowchart illustrating a process 420 for command translation using depth-first significant correlation mapping. The process 420 generally maps a command tree to one or more intents, which may be translated to commands for execution at or by a system or software application. The process 420 may be implemented by a significant correlation framework, as described herein. The process 420 may be integrated with the process 400 shown in FIG. 4A. The process 420 may be implemented as a primary mode or secondary mode, such as shown in FIG. 3.

A command node may be received at 422. The command node may be a data structure or set of related or hierarchical data structures or variables which may store or represent one or more parsed input statements or previous executed commands. Receiving the command node at 422 may include receiving the data structures or variables themselves, identifiers for the data structures or variables, or the memory locations for the data structures or variables.

The parsed input statements in the command may be mapped to intents at 424. Mapping a parsed input statement to an intent may be based on a set of intents available or otherwise provided by a primary interpreter node. For example, textual analysis or natural language processing may be used to match a parsed input statement from the command tree to an intent from a set of intents in the primary interpreter node. Additionally, a primary interpreter may use the "tree" structure to identify a possible "node" matching the command node.

Generally, the command may be traversed at 424, with the passed input statement being mapped when its node is traversed. In embodiments where the command is not a data structure, the various parsed input statement "nodes" (e.g. data object, variable, etc.) may be iteratively visited and mapped at 424. In some embodiments, the traversal of the command at 424 may be a depth-first traversal of the command node. Once mapped, the mapped intent may be stored in the command tree along with the command, or in a respective data object or variable for the command, at 424.

A confidence score may be calculated for the mapped intents at 426. The confidence score may indicate the strength or degree of correlation between the parsed input statement and the mapped intent. For example, the confidence score may be based on the number of times the parsed input statement, or a similar or comparable parsed input statement, has been mapped previously to the intent. The confidence score may be a correlation score, such as shown in FIG. 7C as an example and described herein.

In some embodiments, the confidence score may be calculated during the command traversal at step 424. For example, upon determination of an intent mapping for a node of the command, the confidence score may be calculated for the mapping (and stored, such as in association with the mapped intent) before the command is further traversed to perform the next mapping. In other embodiments, confidence scores may be calculated after all mappings have been determined at 424.

The sequence (or order, or hierarchy, etc.) of the intents in the command tree may be analyzed at 428. Analyzing the sequence of intents at 428 may include comparing the intent structure (e.g. sequence) in the command tree against the sequence or structure of previously executed intents. For example, a record of mapped intents and their sequence or structure may be maintained, and the current intent sequence may be compared against this intent sequence repository to determine if the current intent sequence, or similar sequences, has previously been executed. Analyzing the intent sequence at 428 may include changing or adjusting the confidence scores based on the results of the analysis. For example, if the first intent (e.g. intent in the root node)

is determined to have previously been the first intent, the confidence score for the first intent may remain the same or be increased, while if the first intent is found to normally come after another intent, then the confidence score may be decreased. Analyzing the sequence of intents at 428 may include analyzing one or more recently mapped and executed intents that are not part of the current input statements (e.g. the previous command, the previous two commands, etc.).

The timing of the input command may be analyzed at 430. Generally, analyzing the timing of an input command may be used to analyze the sentiment behind a command which may change over time (e.g. is a time-dependent command). Analyzing the timing of the input command at 430 may include comparing the command(s) against the recentness of the commands or the particular mapping of the command. For example, a record of mapped commands and their date/time of mapping or use may be maintained, and the current commands may be compared against this command timing repository to determine if the current intent mappings are accurate or if the mapping between the input statement and intent has shifted or changed over time (e.g. by users). For example, the timing of a command may be used to analyze sentiment behind an input text which may be dependent on time. Analyzing the command timing at 430 may include changing or adjusting the confidence scores based on the results of the analysis. For example, if a command mapping is determined to have last been used recently (e.g. past 30 days), then the confidence score may remain the same or increase, while if the command mapping is determined to have last been used a long time previously (e.g. over a year ago), then the confidence score may be decreased. In this way, input statements and their corresponding mapped intent may shift over time through use, without changes to the significant correlation framework.

The mapped command tree (e.g. the mapped intents and their confidence scores) may be provided at 432. The mapped command tree may include the command tree received at 422, with the addition of the intents and confidence scores, or a separate command tree with the intents and confidence scores may be provided. Providing the mapped command tree at 432 may include providing the data structures or variables themselves, copies thereof, or identifiers or memory locations for the data structures or variables.

Example 8—Breadth-First Process for Command Translation

Figure 4C:
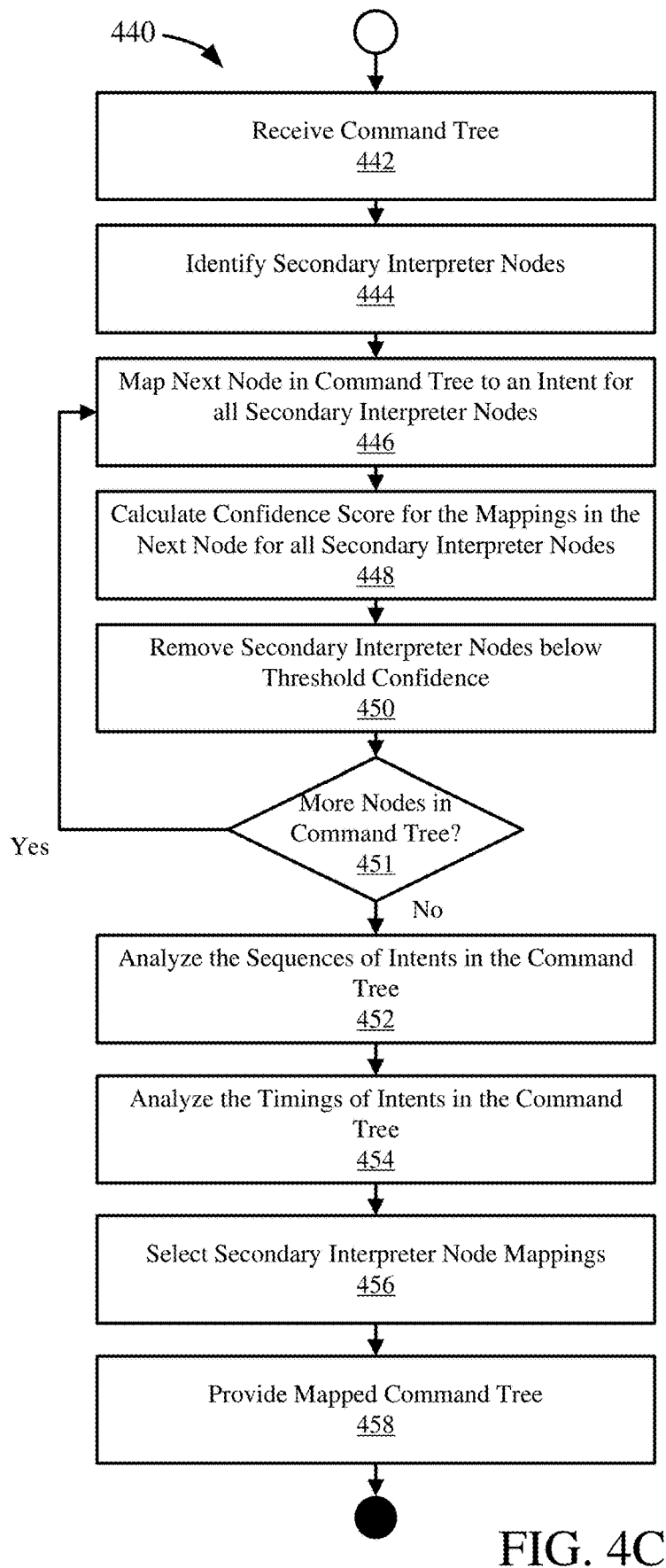
FIG. 4C is a flowchart illustrating a process for command translation using breadth-first significant correlation mapping.

FIG. 4C is a flowchart illustrating a process 440 for command translation using breadth-first significant correlation mapping. The process 440 generally maps a command tree to one or more intents, which may be translated to commands for execution at or by a system or software application. The process 440 may be implemented by a significant correlation framework, as described herein. The process 440 may be integrated with the process 400 shown in FIG. 4A. For example, the process 440 may be integrated as the search intent mapping at 414 in process 400. The process 440 may be implemented as a primary mode or secondary mode, such as shown in FIG. 3.

A command tree may be received at 442, similar to step 422 in process 420 shown in FIG. 4B.

One or more secondary interpreter nodes may be identified at 444. Identifying secondary interpreter nodes at 444 may include searching for accessible or available interpreter nodes. Generally, the secondary interpreter nodes include any accessible or available interpreter nodes that have not already been used in the current command translation process (e.g. interpreter nodes that have not resulted in a successful intent mapping).

A node of the command tree (e.g. a parsed input statement) may be mapped to an intent at 446, similar to step 424 of process 420 shown in FIG. 4B. The node mapped at 446 may be a single node of the command tree, which may be mapped against intents from one or all (or some combination thereof) of the secondary interpreter nodes. Such a broad (e.g. breadth-first) mapping may result in multiple possible mapped intents for a given parsed input statement.

Confidence scores for the intent mappings from step 446 may be calculated at 448, similar to step 424 of process 420 shown in FIG. 4B. If multiple intents are mapped to the parsed input statement at the node, a confidence score may be calculated for each possible mapped intent.

The confidence scores calculated at 448 may be compared to a threshold at 450. If the confidence score does not pass the threshold comparison, the secondary interpreter node which provided the mapped intent of the confidence score may be removed from consideration, as well as the mapped intent. In this way, secondary interpreter nodes that are not providing successful intent mappings may be removed from consideration during this breadth-first command translation process 440.

The process 440 determines at 451 if there are more nodes for mapping in the command tree. If there are more nodes for mapping in the command tree ("yes" at 451), then the next node in the command tree is mapped based on the remaining secondary interpreter nodes at 446. If there are no more nodes for mapping in the command tree ("no" at 451), then the process 440 proceeds with further analysis of the possible intent mappings. In this way, the command tree is mapped against a breadth of interpreter nodes, which may result in an improved or more accurate mapped intent, or in a successful intent mapping that otherwise may not have been successful.

The sequence (or order, or hierarchy, etc.) of the intents in the command tree may be analyzed at 452, similar to step 428 of process 420 shown in FIG. 4B. In embodiments where the parsed input statements separately multiple mapped intents and corresponding confidence scores, the sequence analysis at 452 may include analyzing the separate sequences of intents respectively.

The timing of the intents in the command tree may be analyzed at 454, similar to step 430 of process 420 shown in FIG. 4B. In embodiments where the parsed input statements separately multiple mapped intents and corresponding confidence scores, the timing analysis at 454 may include analyzing the separate intent timings respectively.

A final intent mapping for the command tree (for all nodes in the command tree) is selected at 456. For nodes with a single intent mapping, the current intent mapping is selected. For scenarios where a node has multiple possible intent mappings, the intent mapping with the highest confidence score may be selected (intent mappings with equal scores may be arbitrarily or randomly selected, or selected based on other criteria, such as frequency of use of an intent, etc.).

The mapped command tree (e.g. the mapped intents and their confidence scores) may be provided at 458, similar to step 432 of process 420 shown in FIG. 4B.

Example 9—Command Translation Example

Figure 5:
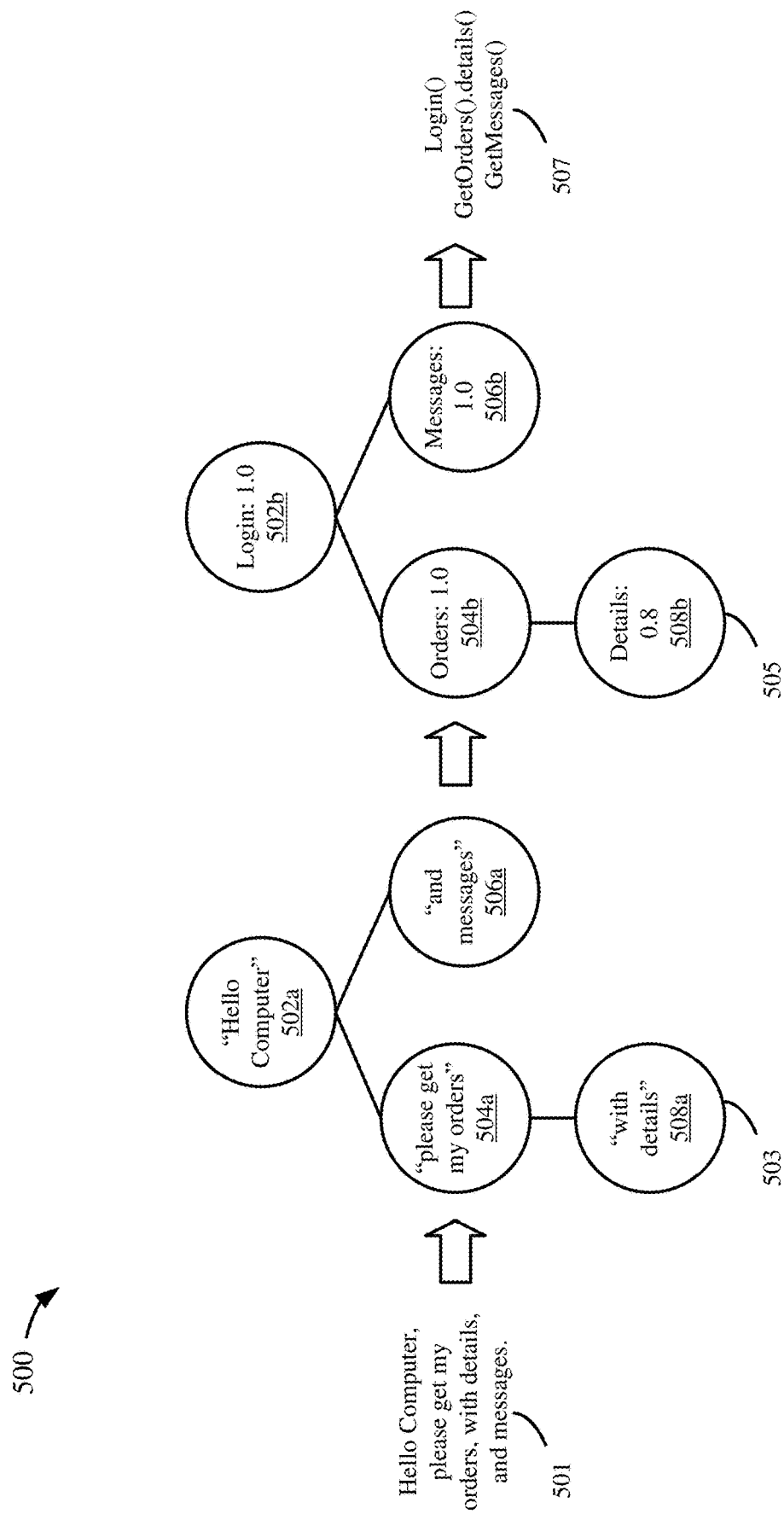
FIG. 5 is a diagram depicting an example process transforming a command.

FIG. 5 is a diagram depicting an example 500 process transforming a command. The example 500 begins with an input statement 501 "Hello Computer, please get my orders, with details, and messages." The input statement may be received via a voice channel or a text channel, such as a messaging application or email. In other cases, the input statement 501 may be received from another command translator, such as Recast.AI. In such cases, the input statement 501 may be parsed (or partially parsed), and may include additional data such as previous commands received or executed, or information on intent mapping failures (e.g. error codes).

The input statement 501 may be transformed to the command tree 503. As part of this transformation, the input statement 501 may be parsed such that the separate commands or requests can be identified. In this example 500, the separate commands may be "hello computer," "please get my orders," "[please get my orders] with details," and "[please get my] messages." The parsed series of commands may be arranged in a command tree 503 with each node 502a, 504a, 506a, 508a having a separate command. In other scenarios or embodiments, the command tree 503 may be arranged differently. For example, node 506a may be connected to node 504a to form a linear series of commands, rather than the root node 502a. In other embodiments or scenarios, the command tree 503 may be a data structure other than a tree, such as a linked list of the series of commands.

The command tree with the series of input commands 503 may be transformed to a command tree with intents 505. As part of this transformation, the series of commands in the command tree nodes 502a, 504a, 506a, 508a may be mapped to intents for the command tree 505. The intents may be stored in the same command tree, or may be arranged in a separate but similar command tree. Thus, "hello computer" 502a may be mapped to an intent Login 502b; "please get my orders" 504a may be mapped to an intent Orders 504b, "[please get my orders] with details" 508a map be mapped to an intent Details 508b, and "[please get my] messages" 506a may be mapped to an intent Messages 506b.

The intent command tree 505 may also have confidence scores calculated for the command-intent mappings, as described herein. For this example 500, the confidence score may range from 0.0 to 1.0. Thus, the intent Login may have a confidence score of 1.0 502b; the intent Orders may have a confidence score of 1.0 504b, the intent Details may have a confidence score of 0.8 508b, and the intent Messages may have a confidence score of 1.0 506b.

As part of providing the mapped intents or intent command tree 505, the intents may be transformed to system function calls 507. Thus, the intent Login 502b may result in executing the Login( ) function; the intent Orders 504b may result in executing the function GetOrders( ), the intent Details 508b may result in executing the function .details( ) with the GetOrders( ) function, and the intent Messages 506b may result in executing the function GetMessages( ). These functions 507 may perform the actual processing or functionality requested by the input statement 501, the results of which may be returned to the user, such as via the channel or user interface which received the input statement.

Example 10—Significant Correlation Framework Environments

Figure 6A:
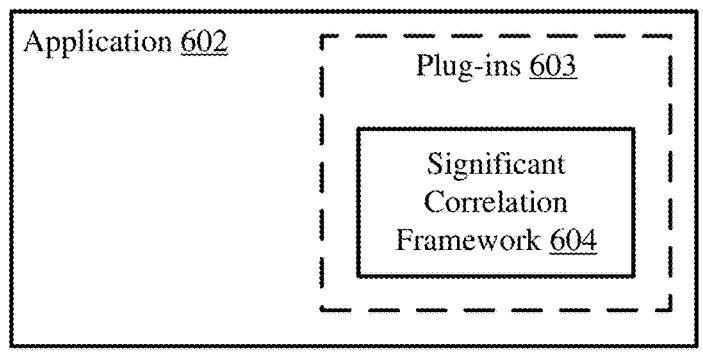
FIG. 6A is a schematic diagram depicting an application environment for a significant correlation framework.

FIG. 6A is a schematic diagram depicting an application environment for a significant correlation framework 604, which may provide command translation functionality as described herein. An application 602, such as a software application running in a computing environment, may have one or more plug-ins 603 (or add-ins or other software extensions to programs) that add functionality to, or otherwise enhance, the application. The significant correlation framework 604 may be integrated with the application 602; for example, the significant correlation framework may be integrated as a plug-in. The significant correlation framework 604 may add functionality to the application 602 for command translation, which may be displayed in a user interface or otherwise provided to a user or used to activate functionality in a data or processing system. For example, the application 602 may be a command translation application, or a system interface application, and the significant correlation framework 604 may be integrated with the command translation or system interface application to provide command translation functionality.

Figure 6B:
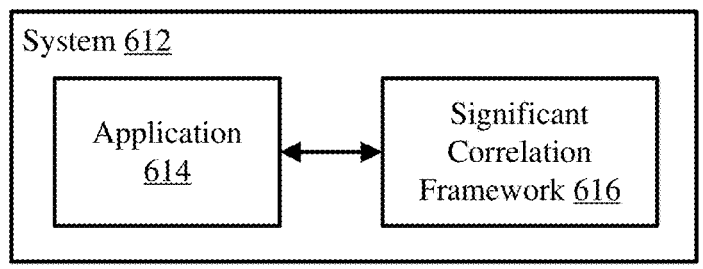
FIG. 6B is a schematic diagram depicting a system environment for a significant correlation framework.

FIG. 6B is a schematic diagram depicting a system environment for a significant correlation framework 616, which may provide command translation functionality as described herein. The significant correlation framework 616 may be integrated with a computer system 612. The computer system 612 may include an operating system, or otherwise be a software platform, and the significant correlation framework 616 may be an application or service running in the operating system or platform, or the significant correlation framework may be integrated within the operating system or platform as a service or functionality provided through the operating system or platform. The system 612 may be a server or other networked computer or file system. Additionally or alternatively, the significant correlation framework 616 may communicate with and provide command translation functionality, as described herein, to one or more applications 614, such as a database, system management, or system interface applications, in the system 612.

Figure 6C:
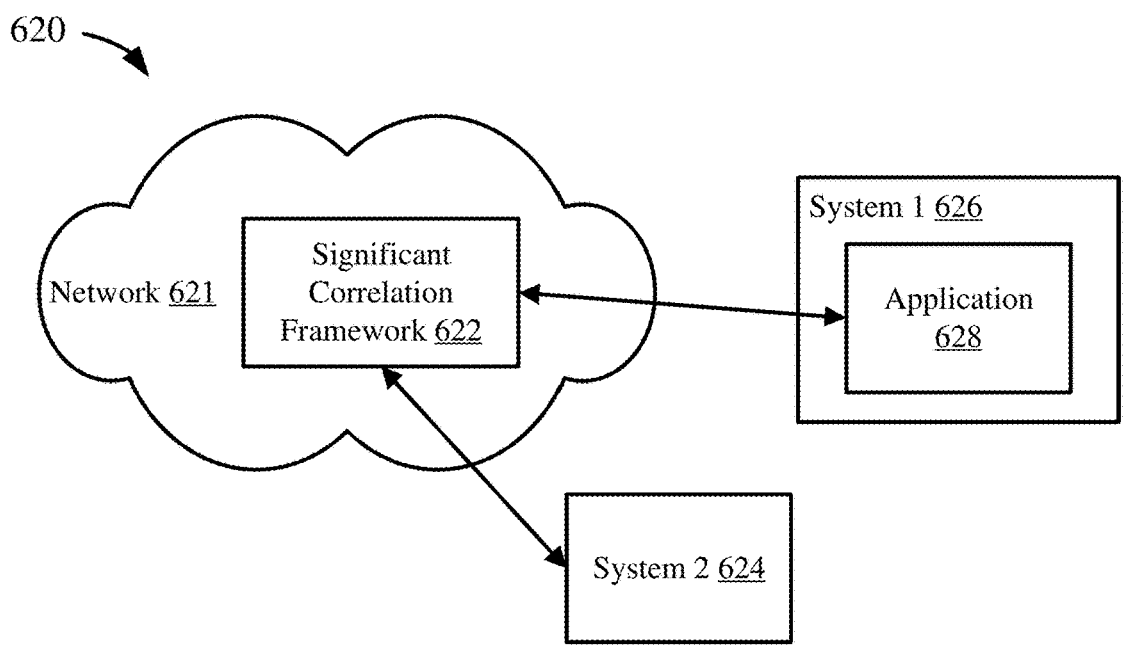
FIG. 6C is a schematic diagram depicting a network environment for a significant correlation framework.

FIG. 6C is a schematic diagram depicting a network environment 620 for a significant correlation framework 622, which may provide command translation functionality as described herein. The significant correlation framework 622 may be available on a network 621, or integrated with a system (such as from FIG. 6B) on a network. Such a network 621 may be a cloud network or a local network. The significant correlation framework 622 may be available as a service to other systems on the network 621 or that have access to the network (e.g., may be on-demand software or SaaS). For example, system 2 624 may be part of, or have access to, the network 621, and so can utilize command translation functionality from the significant correlation framework 622. Additionally, system 1 626, which may be part of or have access to the network 621, may have one or more applications, such as application 628, that may utilize command translation functionality from the significant correlation framework 622.

In these ways, the significant correlation framework 604, 616, 622 may be integrated into an application, a system, or a network, to provide command translation functionality as described herein.

Example 11—Further Description and Features

Figure 7A:
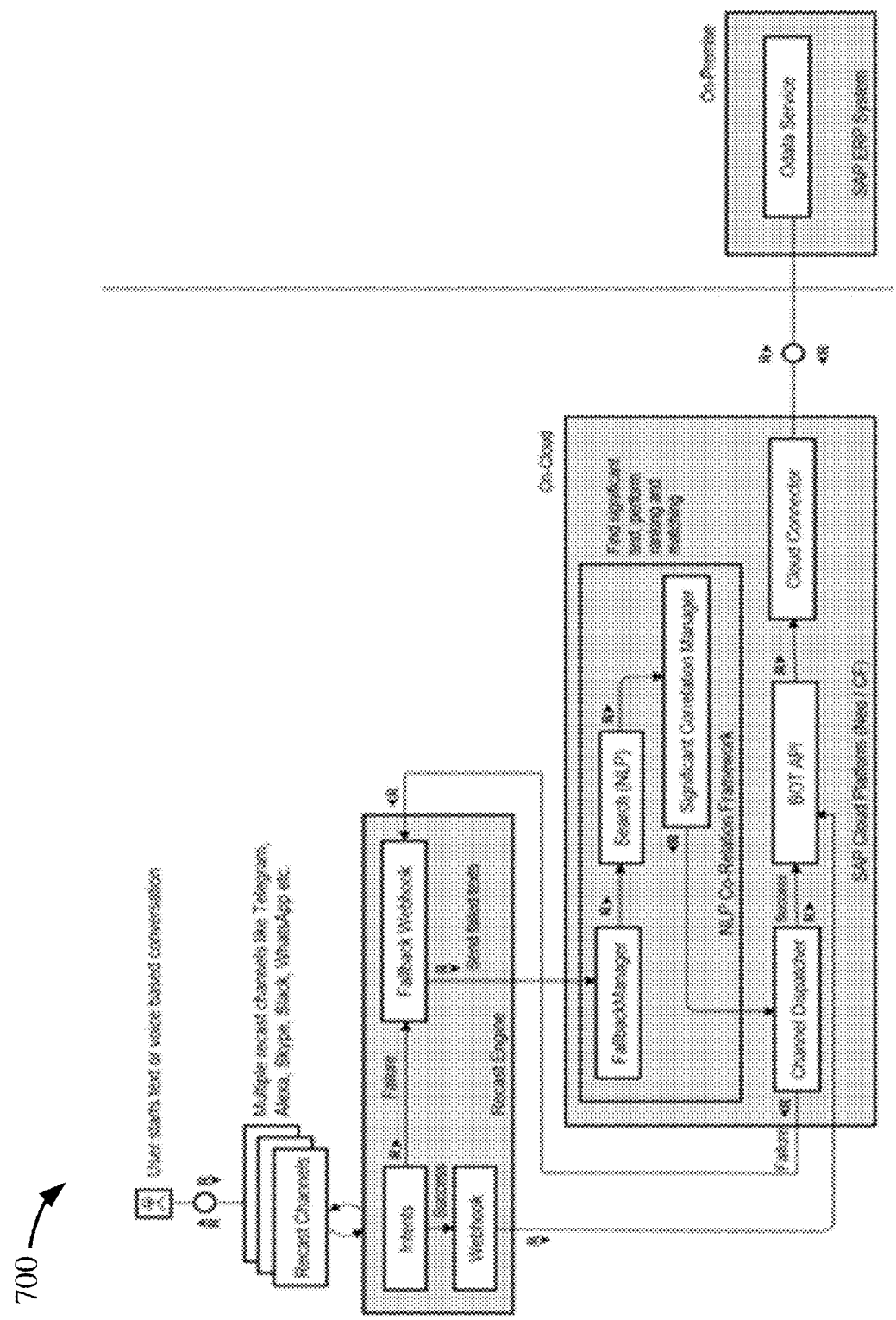
FIG. 7A is an architectural diagram illustrating a significant correlation framework in a cloud environment.

FIG. 7A is an architectural diagram 700 illustrating a significant correlation framework in a cloud environment. The following chart illustrates at least some of the processing stages:

| Input Statement | Command Translator Statement or Intent | Significant Correlation Framework Intent (Or Tree Hierarchy) | Significant Correlation Framework Coefficients/Scores | Interpreter Node/Bot Interpretation |
|---|---|---|---|---|
| Hello | Login | | | Logged in: Time recording Starts automatically |
| Please get my orders | GAD (Get Order) | ---Login | Login - 1.0 | Read Order Details |
| No, change it | ChangeO | ---Login ----- Orders | Login - 1.0 Order - 1.0 | Change Order Details |
| Get me operations details | Ops | ----Login ---Orders ----- Get Operations under the order | Login - 1.0 Order - 1.0 Operations - 1.0 | Get operations details |
| No, Change it | ChangeO | ---Login ----- Orders | Login - 1.0 Order - 1.0 (as we have command change here in orders) Operations - 0.2 (as it is in operations context, however, it context, however, it couldn't find good match with next flat command to operations). So, correlation drops to 0.2 | Change Order Details |

The command Translator Statement or Intent may be determined using "memory ids." Memory ids may be used to create previous transaction details, such as "last 3 transaction" details. The previous transaction details may be formatted into a tree, such as in JSON format in a cloud platform, and then the tree may be traversed there to identify if the current action is a valid action (e.g. we are in validateAction which returns true or false). If validateAction is true, then the current node of the user action is known and execution of the action may be triggered. If validateAction is false, that means that a current action cannot be interpreted from the input statement (e.g. out of context here). Tree traversal may be stopped, and the significant correlation framework moves into horizontal search now (secondary mode). For example,

| Redirect to recordtime and wait for user input | |
|---|---|
| current_transaction | "confirmTime" |
| last_transaction_1 | "getOperations" |
| last_transaction_2 | "getOrders" |

Figure 7B:
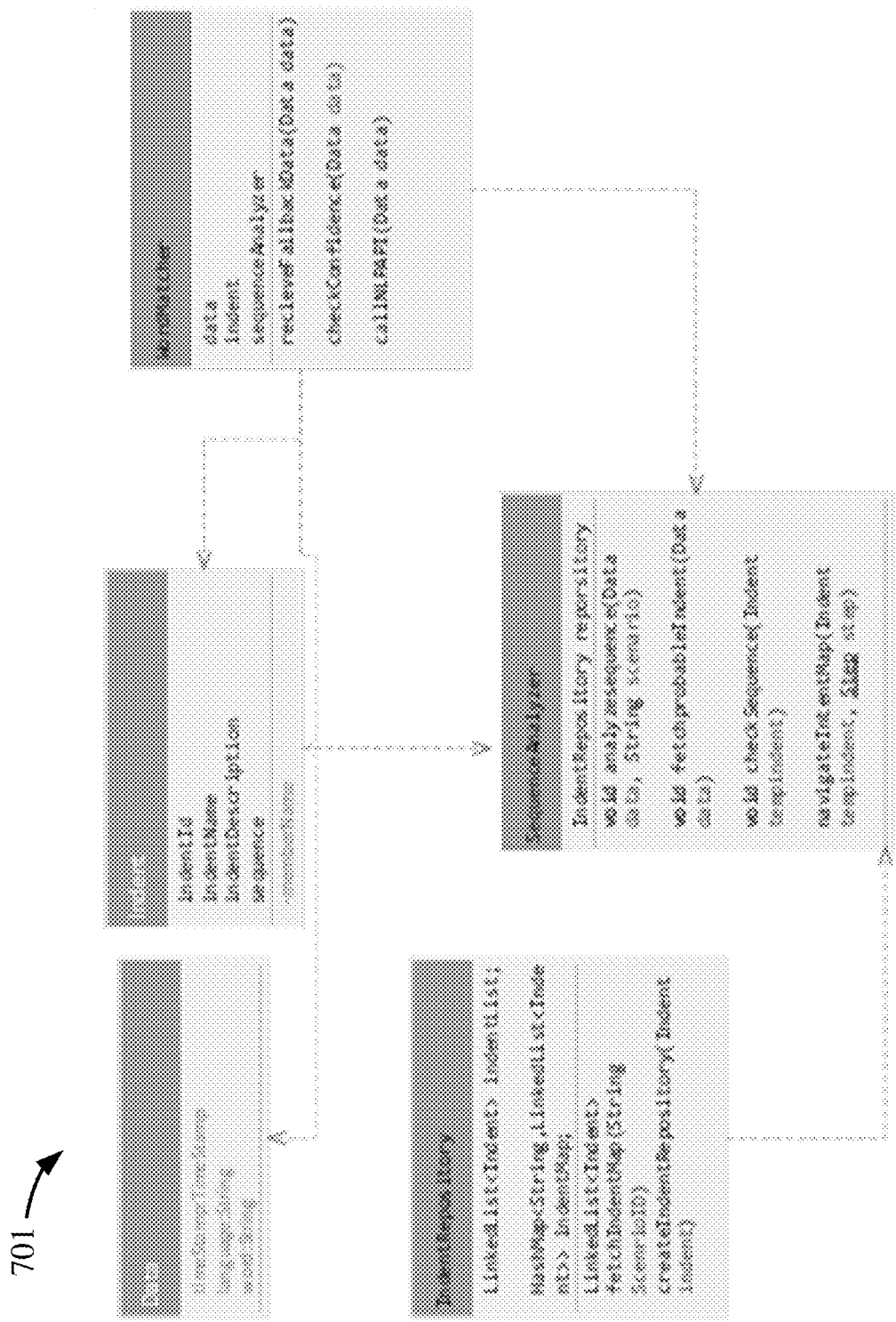
FIG. 7B is a class diagram with data elements which may define how the significant correlation framework intents and coefficients/scores may be implemented.
Figure 7C:
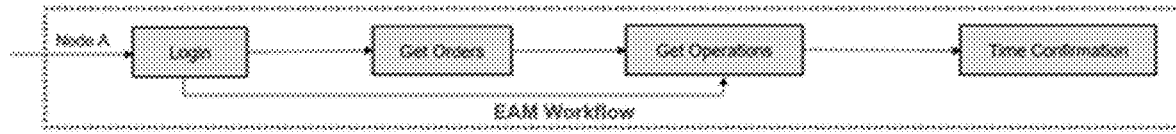
FIG. 7C illustrates an example correlation coefficient/score formula.

FIG. 7B is a class diagram 701 with data elements which may define how the significant correlation framework intents and coefficients/scores may be implemented. The following pseudocode may illustrate how the functionality may be implemented in the significant correlation framework.

An example place holder for capturing data point:

```
public class Data {
    Timestamp timestamp;
    String language;
    String word;
}
```

An example intent placeholder:

```
public class Indent {
    String indentId;
    String indentName;
    String indentDescription;
    String sequence;
}
```

An example intent repository, which contains a JSON map of intents with sequence ID:

```
public class IndentRepository {
    LinkedList<Indent> indentList;
    HashMap<String,LinkedList<Indent>> indentMap;
    public void createIndentRepository(Indent indent){
        indentList.add(indent);
        //Conevert indentMap to Json
    }
    public LinkedList<Indent> fetchIndentMap(String ScenrioID)
    {
        LinkedList<Indent> fetchedList;
        fetchedList=indentMap.get(ScenrioID);
        return fetchedList;
    }
}
```

An example sequence analyzer, which may traverse the map and check if a given fallback intent has enough confidence through NLP API and if the confidence is high then the module will check if the sequence is correct:

```
public class SequenceAnalyzer {
    public IndentRepository reporsitory;
    public void analyzesequence(Data data, String scenario) {
        // TODO Auto-generated method stub
        LinkedList<Intent> indentlist = new LinkedList<>( );
        intentlist = repository.fetchIntentMap(scenario);
        //fetch probable intent with integration from NLP
        fetchprobableIntent(data);}
    private void fetchprobableIntent(Data data) {
        // TODO Auto-generated method stub
        data.getWord( );
        //CALL NLP API to get intent(data.getWord( )
        Indent tempindent = new Intent( );
        tempintent.setIntentDescription(data.getWord( ));
        checkSequence(tempintent);}
    private void checkSequence(Intent tempindent) {
        // TODO Auto-generated method stub
        //navigate to intent map
        Step stepNode =findlaststepPerformed( );
        //checkif the given intent is correct sequence as in the list of
        intents
        navigateIntentMap(tempintent, stepNode);}
    private void navigateIntentMap(Indent tempintent, Step step) {
        // TODO Auto-generated method stub}
}
```

An example wordmatcher, which may check the confidence of a given word via NLP API and, if the confidence is sufficient, the module calls sequence analyzer service to check if sequence is correct:

```
public void recieveFallbackData(Data data){
    //Call NLP API to check confidence if the word is correct
    boolean isCorrectData = checkConfidence(data);
    //if yes then call below method
    if(isCorrectData)
        sequenceAnalyzer.analyzesequence(data,scenario);
}
private boolean checkConfidence(Data data2) {
    int confidenceScroe = callNLPAPI(data2);
    if(confidenceScroe>0)
    return true;
    else return false;
}
private int callNLPAPI(Data data2) {
    // TODO Auto-generated method stub
    return ( );
}
```

Interpreter Node/Bot Interpretation may be a command that the command translator can send for execution, which may be done automatically if the command is known. When the system fails to identify a command (e.g. cannot identify a command or the command provided is not known), it goes to "fallback" functionality. The fallback functionality may use the significant correlation framework or algorithm described herein and then map the results to existing commands again. This makes the command translator/bot work on commands that initially failed as well. For example, rather than provide a fallback failure message, such as "invalid command," the fallback service may be invoked to find a best-match (or next-best-match) using the significant correlation framework. This fallback functionality using the significant correlation framework may reduce, or significantly reduce, the number of invalid or failed commands.

Thus, a command such as "Ods," "Opts," "Opt," or "Opter," which may fail in a command translator (such as Recast or Alexa) may be successful and provide operation details to the user when processed through the significant correlation framework, and may be done so automatically when the significant correlation framework is triggered as a fallback. This illustrates how a flat series of commands, which may not be related or at times are related, may be automatically mapped to a tree structure of commands, which may then generate correlation coefficients or scores to identify and execute a correct command.

Correlation Coefficient/Score Formula

FIG. 7C illustrates an example correlation coefficient/score formula 702. The correlation formula results in value (r), which is generally the calculation of relationship score between a list of predefined user actions (x) and user entered actions (y). The correlation coefficient formula is generally a very helpful statistical formula which measures strength between predefined actions and user actions. When conducting a statistical test between two variables, it is often effective to calculate correlation coefficient values to determine how strong that relationship is between any two values. In our case, it would be the relationship between predefined actions and user entered actions. The coefficient value can range between −1.00 to 1.00. If the coefficient value is in the negative range then that means the relationship between predefined actions and user actions is negatively correlated, or one value increases and other value decreases. If the value is in the positive range, then that means the relationship between predefined actions and user actions is positively correlated, or both values increase or decrease together. In the following table, an example definition is provided of the strength of a relationship or association based on the coefficient value (r) which might be in negative or positive range.

| Strength of Association | Negative Coefficient Value | Position Coefficient Value |
|---|---|---|
| Weak | −0.1 to −0.3 | 0.1 to 0.3 |
| Average | −0.3 to −0.5 | 0.3 to 0.5 |
| Strong | −0.5 to −1.0 | 0.5 to 1.0 |

There may be a linear relationship between predefined actions and user actions. Outlier data points may be removed or kept below a threshold in the analyzed data set. An outlier is a data point which generally doesn't fit the general trend of the data but would appear to be an extreme value (e.g. a user's action input) and not what may be expected to compare to the rest of the data points (e.g. predefined actions). The significance of outlier (user actions) may be identified using NLP features of machine learning where the sentiments of user typed action are known. If the significance of outlier (user actions) is not matching with the master data points (predefined action), then it can be discarded, flagged, or removed completely.

Deep Dive and Node Switch Modes in Significant Correlation Framework

Figure 7E:
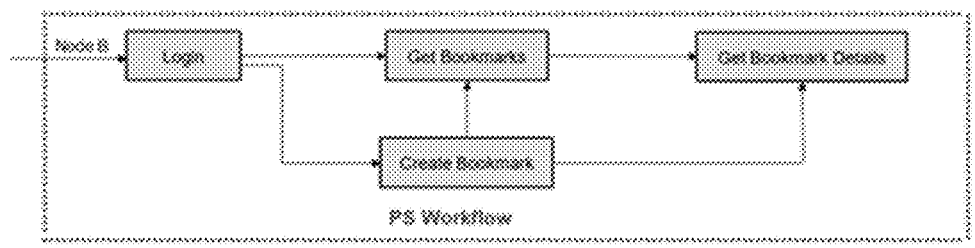
FIG. 7E illustrates providing inputs in workflow process mapping diagrams.
Figure 7D:
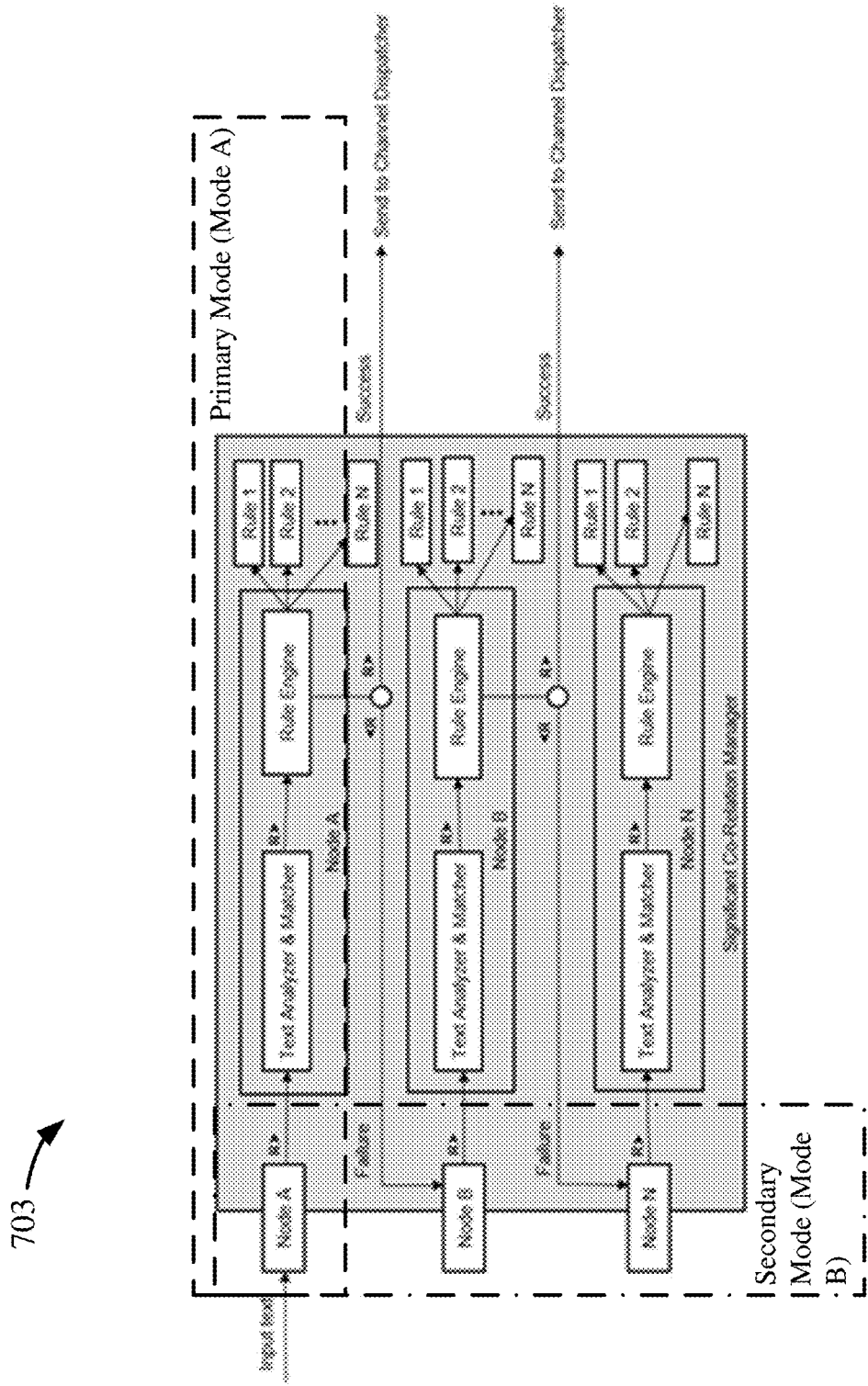
FIG. 7D depicts an architecture diagram for a significant correlation network and its primary mode (mode A) and its secondary mode (mode B).

FIG. 7D depicts an architecture diagram 703 for a significant correlation network and its primary mode (mode A) and its secondary mode (mode B). The nodes (A, B, N) may be tree nodes in software, which may be data objects, such as the interpreter nodes described herein. The significant correlation framework may work in two modes.

The primary mode may be a deep dive mode within the same context or context node. If we want to optimize the output command for "Best Matching Scenario" or "Reduction of Failure", a "Depth First Search" may be used, such as in the primary mode. In this mode, the next command may be mapped using "Depth First Search" and then correlation coefficients are calculated. This enables the application to behave "intelligent" and interpret the "next possible user command" effectively. This mode may be useful for field or operational users, or other users that generally like to execute commands with context sensitive information. For example, this mode may be useful for a sequence of commands like "Do A, Then Do B, then Do C".

The secondary mode may be a node switch mode, which may switch between different contexts or context nodes. If we want to optimize the output command for "Find best matching scenario with vague inputs or invalid contextual input", a "Tree Breadth first search" may be used. This mode may help to remove context, such as when it is not helpful, and traverses the tree from the top hierarchy again (e.g. of interpreter nodes). The secondary mode may be useful for "general managers" who would generally like to ask "top few queries" like "get me top line details", "get me net profit," etc. Such commands may not be followed in a sequence, or sequentially related. For example, this mode may be useful for a sequence of commands like "Do A, Do B, start from beginning and Do D" (unrelated topic).

The process may include: input text is coming from a command translator interface (e.g. Recast with Fallback logic). The input may be fed to populate Node A. Node A may be a data object having attributes as "current_comand", "last_transaction_1", "last_transaction_2," etc. The node A data object may be passed to a textAnalyzer function module which may internally call a rules engine. The rules engine performs a text search and context search using tree nodes. The rules engine may identify a possible solution (e.g. intent or output command) of the user action, which, if the input was a failed action, may attempt to clean the failed transaction to make it into success node with a mapped intent or command. Thus, acting as a cleansing agent.

The cleansing may fail if it is unable to identify a match or the correlation coefficient falls below a threshold (e.g. 50%). In such cases, the secondary mode of the significant correlation framework may be activated. In the secondary mode, the framework goes to "top of tree" and finds other interpreter nodes. These nodes may be a new interpreter node or bot altogether.

For example, a node "AviBOT" (which handles orders, operations and time confirmation" may have failed, and the significant correlation framework in mode B may identify another bot "project systems," which it begins to use to map the input to an intent or command. In this way, the significant correlation framework may be a wrapper framework on top of a command translator (such as Recast or Alexa) which may tie all the BOTs together rather than require user selection or other initial selection. The interpreter nodes or bots may not be in a tree hierarchy.

The following is an example use case process:
1. User says "ask Akshat please bring my orders".
    a. The Node is "Akshat"
    b. Context is "orders".
    c. If the user now says "ask Akshat get my bookmarks," this is likely to fail because there is no "bookmark" context in Akshat node.
        i. The fallback context is triggered to invoke the significant correlation framework.
        ii. It moves in Mode A, and tries to find all relevant context in same node (Akshat), which fails as well.
        iii. Then, it moves to Mode B and tries to find all relevant contexts in next node.
        iv. This finds "ask Prachi get my bookmarks"
        v. Based on the discovered expression, the significant correlation framework re-models the query differently and then the command may be executed, retrieving the bookmarks.

Intellibot Application Workflows

FIG. 7E illustrates providing inputs in workflow process mapping diagrams 704. Workflows may be stored in a "Rule Engine," which may be available in a cloud platform or cloud application. This generally helps to get the "right context" and may provide "cleanup" of failure scenarios (e.g. inability to translate a command to an executable action).

A failure to identify a correct match may trigger the significant correlation framework. The significant correlation framework may calculate coefficient value, or correlation score or confidence score, of <50%, which generally indicates that no good match could be found in the current node (e.g. interpreter node or bot).

A search for another interpreter node or bot may then be triggered, which may include searching multiple or all available interpreter nodes or bots, which accordingly may calculate separate correlation coefficients for the additional bots. In this way, interpreter nodes or bots which are un-related are tied together by the significant correlation framework.

For example, a list of intents may include @confirm_time, @confirm, @image, @getmaterial, @getorders. An expansion of the @getorders may provide possible expressions that may be mapped to @getorders, such as "please want my order," "please find my order," "please know my order," or "please get my order."

Thus, such input can lead to various errors when diverse users start using the application, which could lead to failed commands. The command translator may then need more and more training, or more and more rule development. Generally, the significant correlation framework and recursive training described herein prevents the need for such additional training or development by adapting and "learning from history," including as history changes over time. The time dependent correction framework adaption may "future proof" the command translator or significant correlation framework.

Figure 7F:
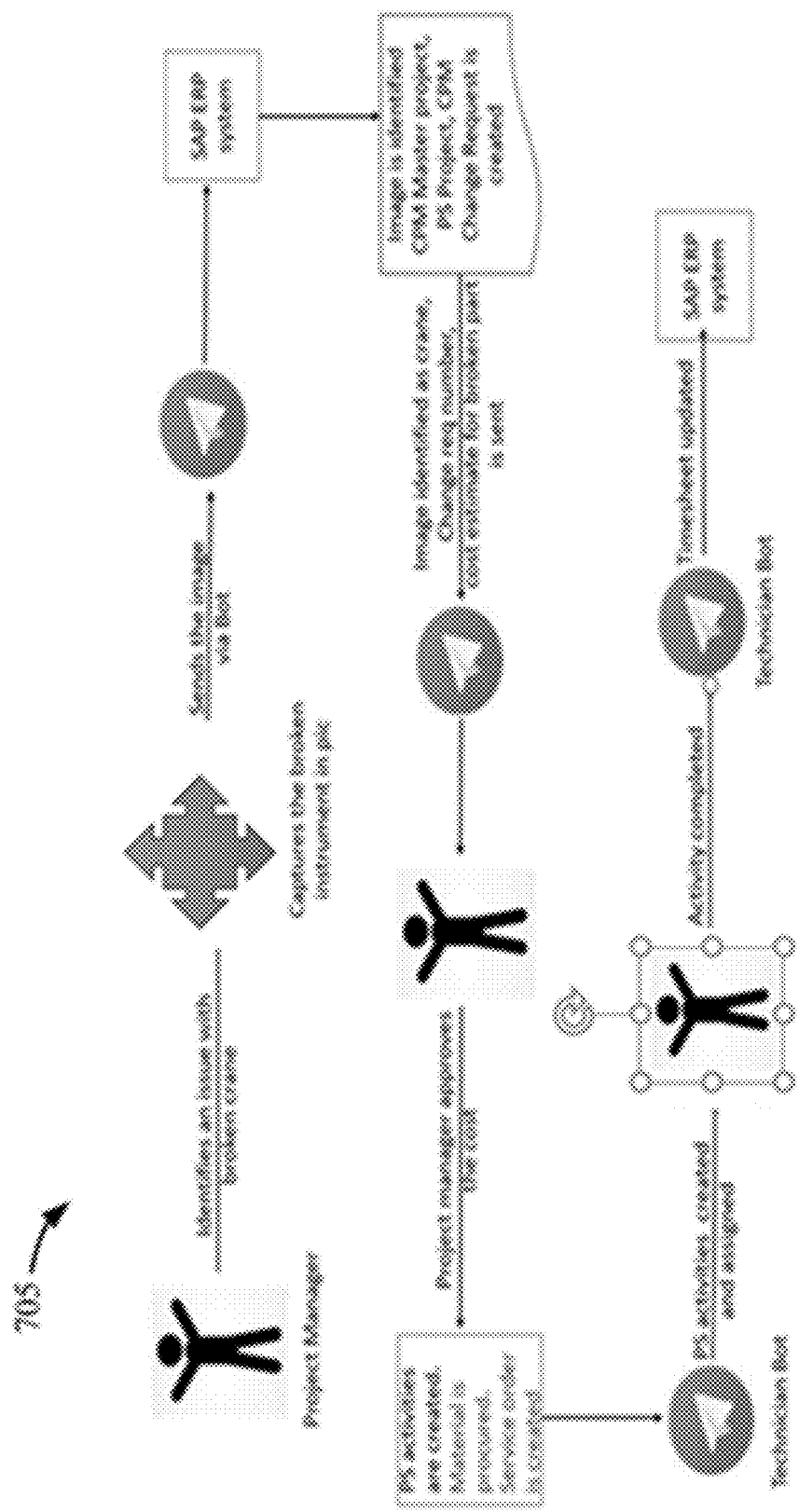
FIG. 7F illustrates an example use case.

Thus, the significant correlation framework can build a dynamic tree construction to make contextual analysis, like in above example, as (example command tree):
—Login
  —Orders
    —Get Operations under the order FIG. 7F illustrates an example use case 705. In this case, the tree hierarchy is very complex. As you can see in the step where the image is identified, control shifts from EAM context to CPM context. This is generally extremely difficult with common methodologies, but the significant correlation framework can be used to make automatic contextual setting change based on the user actions. This contextual change is done using mode B or the secondary mode, which generally provides wide coverage (e.g. "Wide Coverage Mode"), which in some cases may take precedence over Mode A or the primary mode (e.g. Deep Dive Mode). This context change may be accomplished using business rules based context setting available in the significant correlation framework. For example, a correlation coefficient value <50% may cause this change.

Figure 7G:
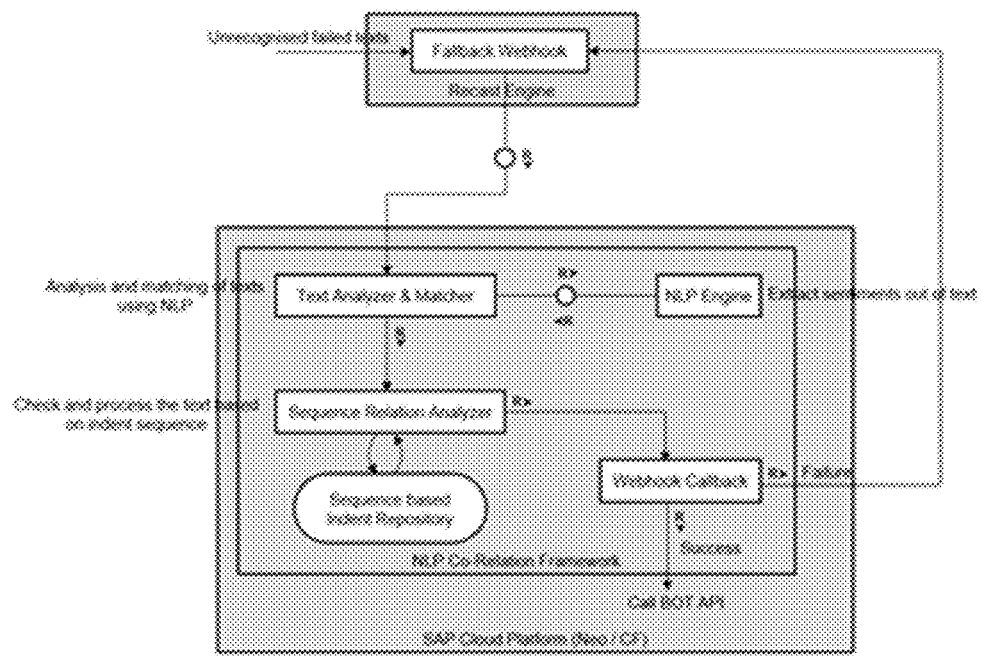
FIG. 7G is an architecture diagram with an example sequence analyzer diagram.

FIG. 7G is an architecture diagram 706 with an example sequence analyzer diagram.

Figure 7H:
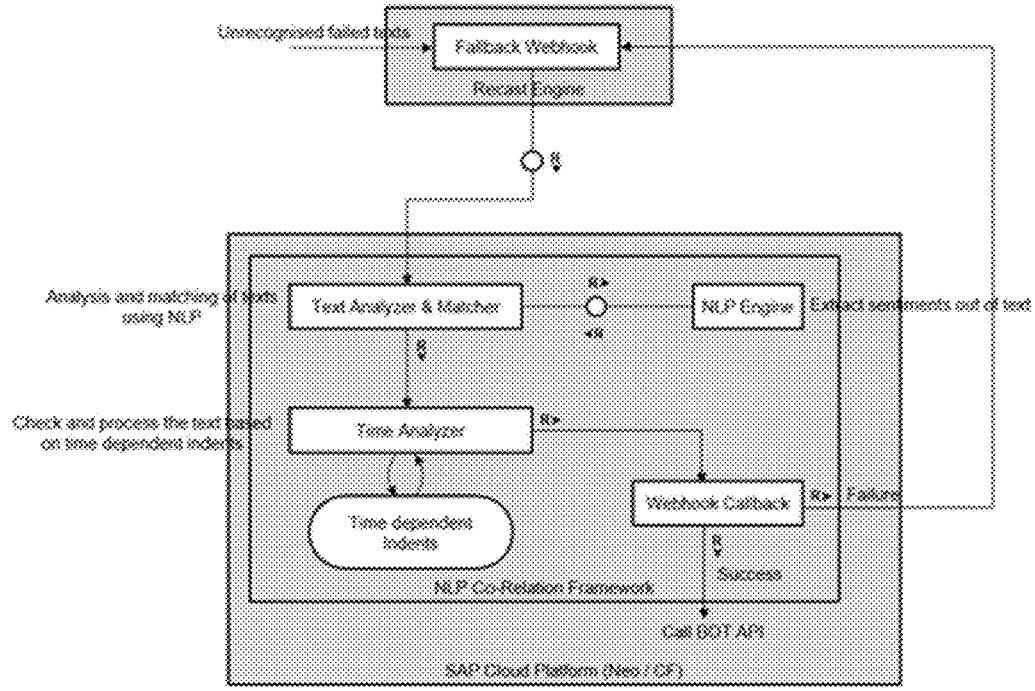
FIG. 7H is an architecture diagram with an example timing or time-dependent intent analyzer diagram.

Significant Correlation Framework with Sequence Relation Analyzer and Time-Dependent Intents for better optimized formatted response. FIG. 7H is an architecture diagram 707 with an example timing or time-dependent intent analyzer diagram.

Generally, the command translator or significant correlation framework are trying to analyze sentiment behind a text or other input which may be dependent on time. A time analyzer is provided that may allow a command translator/significant correlation framework to understand the context behind an input command based on the time when the command was created or provided. A core concern in NLP is how to best represent text data so that a computer can make use of it. The time analyzer generally addresses the problem of representation of the same set of data whose context might change over a period of time. The time analysis may change the correlation coefficients, or the correlation or confidence score.

Auto-Feed and Auto-Learn Recursive NLP Framework

Figure 7I:
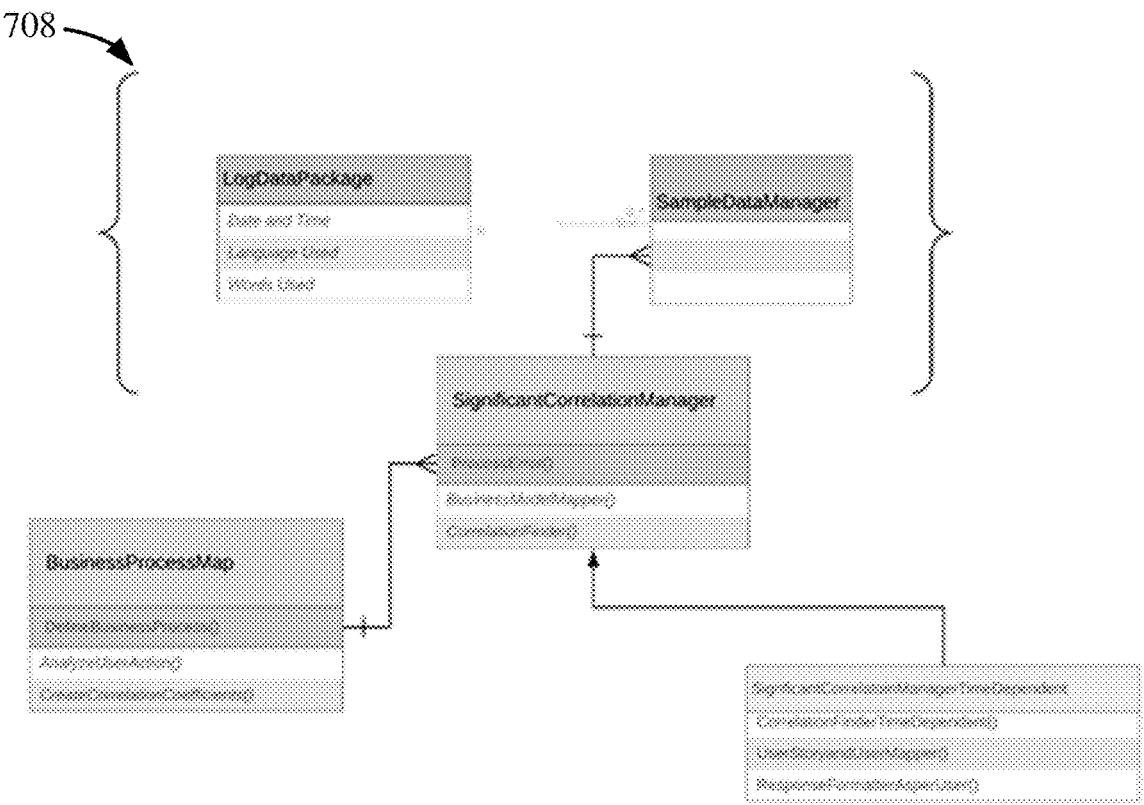
FIG. 7I is a class diagram for components of a significant correlation framework.

FIG. 7I is a class diagram 708 for components of a significant correlation framework. For the channels listed in the command translator, NLP techniques may be used to enhance the user experience by reverse engineering of NLP results. This may include gathering results of failed NLP texts as the input for new intents in the command translator.

For example, when a user provides text or other input to a command translator interface or bot, then it will be processed by the command translator based on current intents. In cases where the translator fails, the failed text or other inputs may be stored inside a database and then sanitized. These stored failed inputs may be used to create (in some cases, automatically) new intents based on the failed text. By using this scenario, the NLP engine (e.g. of the command translator or significant correlation framework) may become more intelligent, as it learns from its own failures.

Recursive Learning Pattern

Figure 7J:
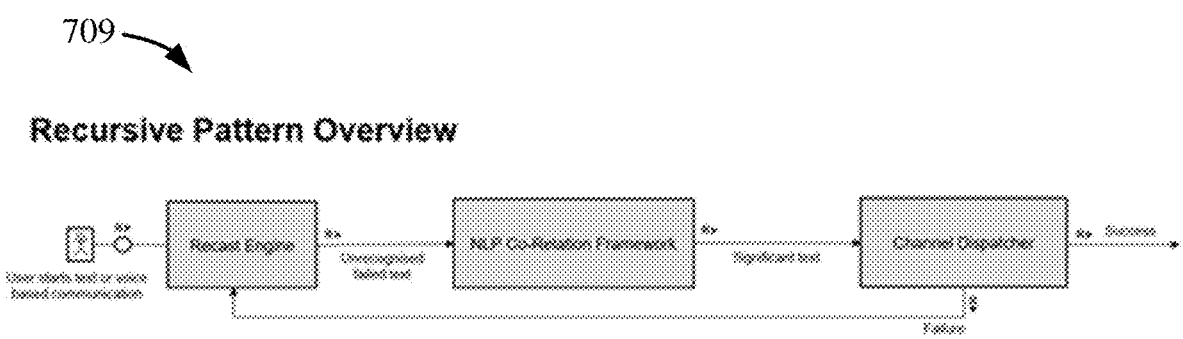
FIG. 7J is a component diagram illustrating a recursive learning pattern overview.

FIG. 7J is a component diagram 709 illustrating a recursive learning pattern overview. The recursive learning pattern may make the significant correlation framework or bot more intelligent with usage. This approach also works well with translation features where a user can type the text in any language as we have used collection approach in our database where we are storing texts in collections based on its type of language like English, German, French etc.

A command translation, such as Re-cast, is typically used as "Natural Language processing engine." However, the command translation engine may also be used as an "error detection framework" and a "self-correction" framework.

For example, when the user is using an application, a command translation bot might be able to provide 70% accurate results. However, there is thus a chance of ~30% errors which is often dependent on "user by user" error rather than generic errors in the system. The command translator may be used to capture and maintain an error log, which may be read when the system is unable to process a provided command or response and provide a machine learning algorithm there to identify the patterns of failure. A right-first tree module hierarchy may be used to store the commands by the user, which may be given in flat structure (and may be stored in flat structure, such as by the command translator).

Business rules, such as in a business rule engine may be used in these cases. So, we may have a tree mapping done of Business Process Map which may contain contextual information on the command processing engine. So, the command translator and/or the significant correlation framework may keep the check or track if user behavior is in alignment with context, and then acts accordingly (e.g. select the applicable action or intent).

This innovative way of re-mapping the commands make it easier for error detection and hence our innovation provides insights to make the BOT (e.g. command translator or significant correlation framework) do "self-correction" of the commands accordingly.

A failure may be the trigger point for the recursive learning pattern. The failure may trigger the service as a fallback service. So, the failure command may be used as input to the processing engine (e.g. command translator, significant correlation engine). A Fallback Manager may be an error collector from a command translator (e.g. Recast, Alexa, Siri, etc.) and may act on top of errors to convert them to successes. The significant correlation framework then does the mapping and identifies the co-efficient variables (e.g. correlation or confidence scores) and then process to translate the command. If it finds the best match or at least 50% match, the framework stays in current node (e.g. interpreter node) and triggers the right command. Else, it goes to the next interpreter node (e.g. bot) and so on (this may be the secondary mode).

Multi-Lingual Support

The natural language processing, described herein, may depend upon the particular language in which the input commands are provided. A user may mix the words of different languages or might use their native language words with some other language words like English with German or English with French. This is where conventional command translation often fails.

In such scenarios, the language context or the natural language may be identified for each paragraph or sentence of the input commands. NLP-based decompounding features may also be used, which may split compound words into smaller parts to get more accurate NLP results, which may be useful for natural languages that heavily use compound words.

In some cases, users may use acronyms, slangs and abbreviations while inputting commands. In such cases, a tokenization approach may be used, which may include dividing each character stream into tokens which will be used for further processing and understanding. These tokens can be words, numbers, identifiers, punctuations and intends. Such tokenization may include acronym normalization, lemmatization, sentence and phrase boundary identification, entity extraction, or statistical phrase extraction.

User details may also be used to improve the performance of the command translation as described herein. The information of user may be extracted using entity extraction which may identify and extract such information as the phone number, job profile, work history, company and places the user has already operated. For performing the entity extraction, NLP techniques like Regex extraction, Dictionary extraction, Complex pattern-based extraction and Statistical extraction may be employed.

Based on the described features above, the input text or image data may be sanitized and stored in a database, which may be integrated into the command translation as new intents. This process may be repeated as a user provides inputs which a command translator doesn't process properly. With this recursive NLP pattern, the significant correlation framework may become more intelligent, and so understand a broader range of input commands.

Adapter Framework for Enterprise Applications

Figure 7K:
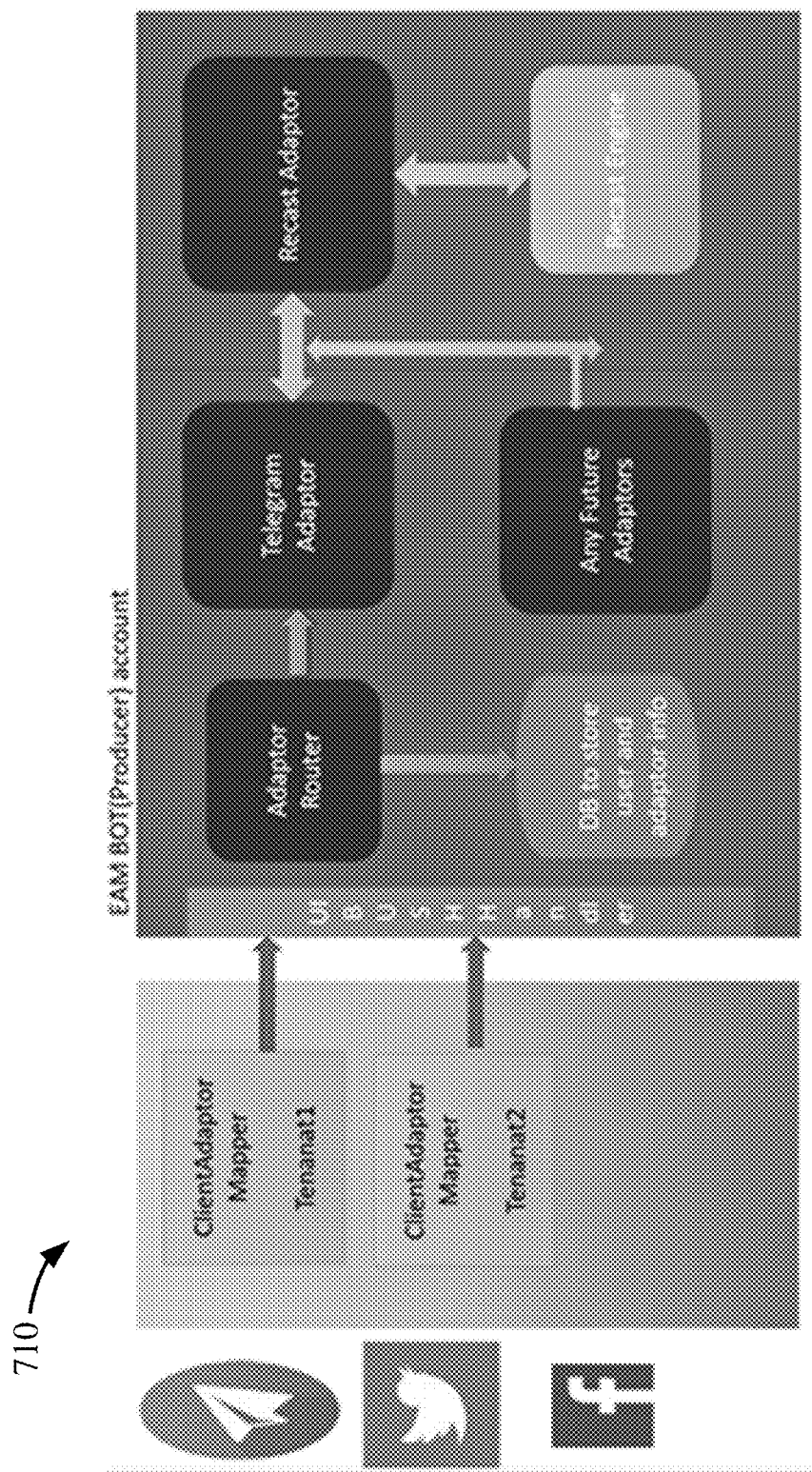
FIG. 7K is an architecture diagram depicting an adapter framework for command translators or the significant correlation framework.

FIG. 7K is an architecture diagram 710 depicting an adapter framework for command translators or the significant correlation framework. A user may access a processing system through any number of channels, such as messaging services or voice-activation services. A set of APIs are provided which generally can direct received input commands to the significant correlation framework and thereby trigger appropriate actions for the same. Once the triggered actions are completed, the APIs may receive the response and provide it to the user via the initiating channel.

With this kind of framework users may have the power to use ERP data which is behind a firewall on their mobiles as well. The system may also learn user behavior and may trigger regularly performed or scheduled actions as well.

With such "Adaptor Technology," ERP or other processing systems may now virtually support any device (e.g. "BYOD"—Bring Your Own Device).

The set of APIs may be channel independent by adapting the single channel JSON to a plurality of channel JSONs, which enables seamless integration. Such APIs may include the following functions: getConversation( ): this API fetches a particular conversation being established; getMessage( ): this API can be used to fetch content (image/text or voice) for a particular conversation ID; getIntents( ): this API helps in getting intents and respective actions against a received message; sendMessage( ): this API pushes the message to required channel; createChanel( ): this API helps in creating channel as per preference from customers.

By providing sufficient APIs for integrating with any input or interface channel, users may avoid migrating their entire application or data into the cloud. Instead, users may migrate target data that generally needs to be accessed on the cloud, which may provide an additional layer of security by retaining some data on premise.

The API adaptors generally adapt the "inputs" and "outputs" to different contexts and makes the processing system platform independent when accessed via the significant correlation framework.

Dual-Direction Support

Generally, messaging applications are "single way communication." A processing system or "end business application" generally sends notifications or other basic information to the end user. Such scenarios are not working in a "dual directional."

The command translation technology described herein allows a user to utilize any functionality available in the processing system, such as completing work, adding/storing data, or informing about tasks or activities, like "picture of the work done to act as confirmation of work done," etc. Thus, dual direction support is provided. Such improvements increase the usability of mobile devices with cloud or centralized data or processing systems.

Figure 7L:
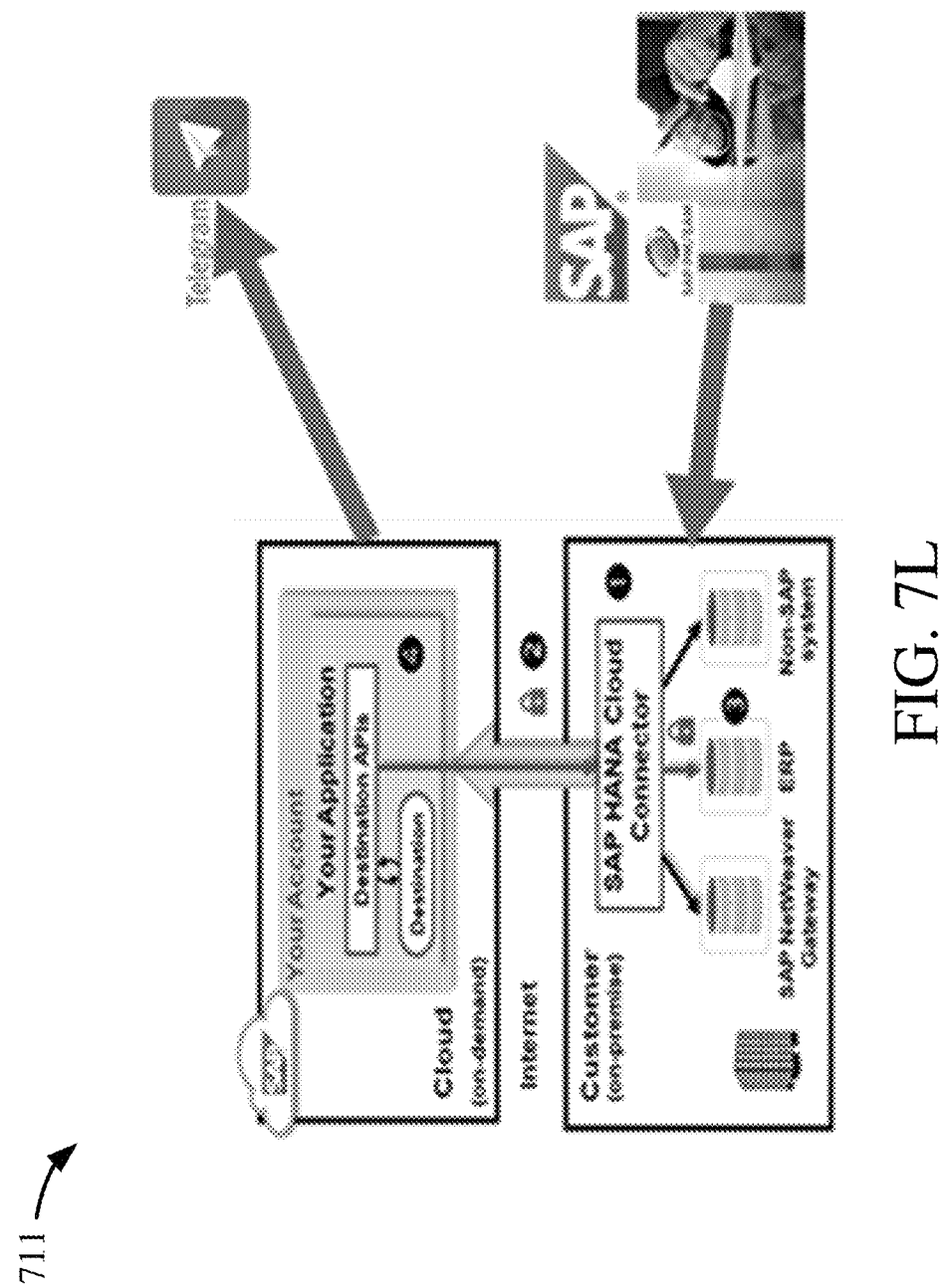
FIG. 7L is a diagram depicting an example implementation system of a significant correlation framework.

FIG. 7L is a diagram 711 depicting an example implementation system of a significant correlation framework. A significant correlation framework, as described herein, may be implemented or integrated with several SAP technologies (such as SAP ECC™ technologies, SAP S/4 OP™ technologies, SAP Cloud Platform™ technologies, or SAP HANA Cloud Interface™ technologies) and made available on-demand in the cloud. Such implementations may increase the effectiveness of integration with open source technologies, such as Telegram™ technologies or WhatsApp™ technologies.

Example 12—Computing Systems

Figure 8:
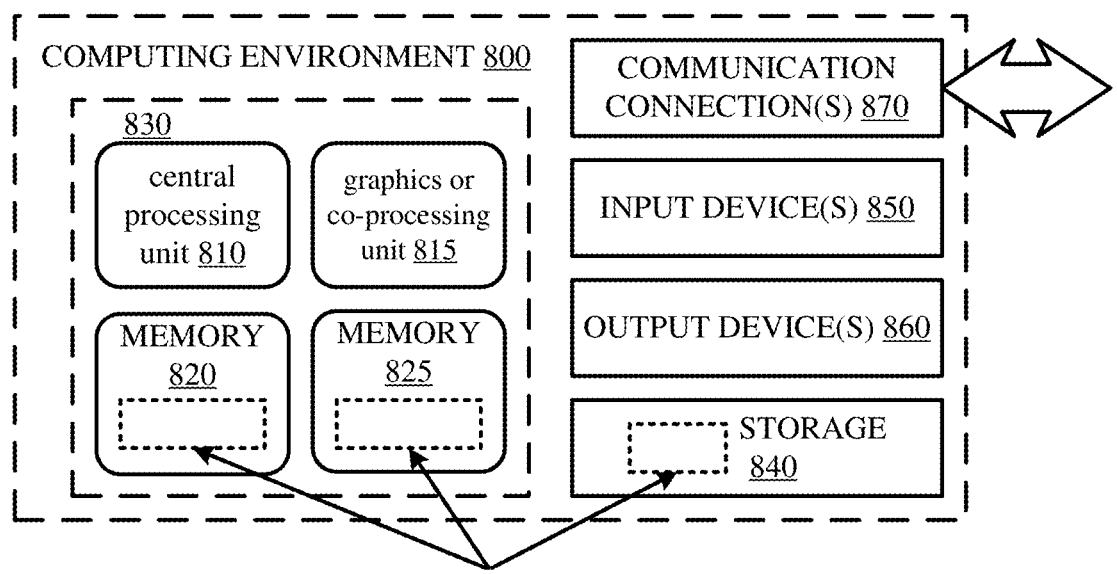
FIG. 8 is a diagram of an example computing system in which described embodiments can be implemented.

FIG. 8 depicts a generalized example of a suitable computing system 800 in which the described innovations may be implemented. The computing system 800 is not intended to suggest any limitation as to scope of use or functionality of the present disclosure, as the innovations may be implemented in diverse general-purpose or special-purpose computing systems.

With reference to FIG. 8, the computing system 800 includes one or more processing units 810, 815 and memory 820, 825. In FIG. 8, this basic configuration 830 is included within a dashed line. The processing units 810, 815 execute computer-executable instructions, such as for implementing components of the processes of FIGS. 4A-C, the systems of FIGS. 1A-C, 2, 3, and 12A-C, or the translation example of FIG. 5, and the examples of FIGS. 7A-L. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s) 810, 815. The memory 820, 825 stores software 880 implementing one or more innovations described herein, in the form of computer-executable instructions suitable for execution by the processing unit(s) 810, 815. The memory 820, 825, may also store settings or settings characteristics, data sets, interfaces, displays, or commands, trees, or representations shown in FIG. 5 and FIGS. 7A-L, systems shown in FIGS. 1A-C, 2, 3, and 12A-C, or the steps of the processes shown in FIGS. 4A-C.

A computing system 800 may have additional features. For example, the computing system 800 includes storage 840, one or more input devices 850, one or more output devices 860, and one or more communication connections 870. An interconnection mechanism (not shown) such as a bus, controller, or network interconnects the components of the computing system 800. Typically, operating system software (not shown) provides an operating environment for other software executing in the computing system 800, and coordinates activities of the components of the computing system 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing system 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing system 800. The output device(s) 860 may be a display, printer, speaker, CD-writer, or another device that provides output from the computing system 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 13—Cloud Computing Environment

Figure 9:
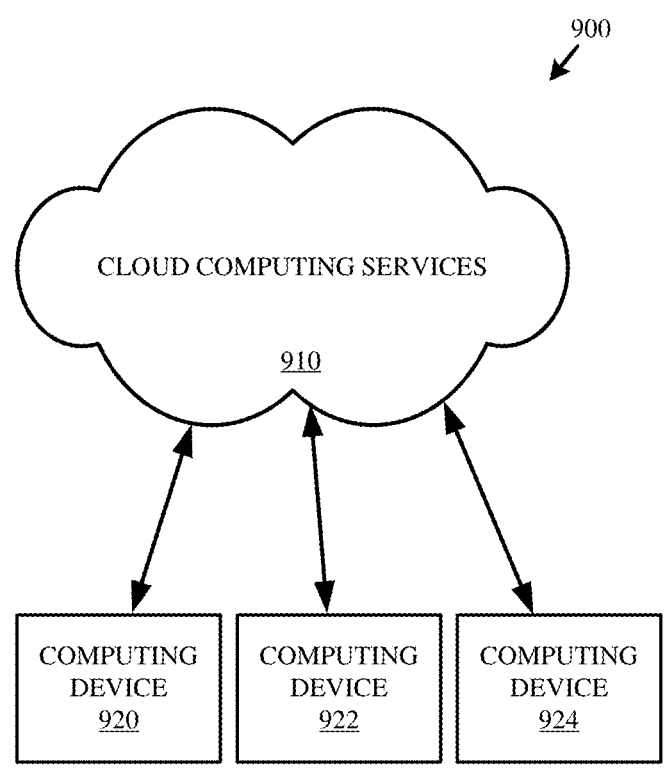
FIG. 9 is an example cloud computing environment that can be used in conjunction with the technologies described herein.

FIG. 9 depicts an example cloud computing environment 900 in which the described technologies can be implemented. The cloud computing environment 900 comprises cloud computing services 910. The cloud computing services 910 can comprise various types of cloud computing resources, such as computer servers, data storage repositories, networking resources, etc. The cloud computing services 910 can be centrally located (e.g., provided by a data center of a business or organization) or distributed (e.g., provided by various computing resources located at different locations, such as different data centers and/or located in different cities or countries).

The cloud computing services 910 are utilized by various types of computing devices (e.g., client computing devices), such as computing devices 920, 922, and 924. For example, the computing devices (e.g., 920, 922, and 924) can be computers (e.g., desktop or laptop computers), mobile devices (e.g., tablet computers or smart phones), or other types of computing devices. For example, the computing devices (e.g., 920, 922, and 924) can utilize the cloud computing services 910 to perform computing operations (e.g., data processing, data storage, and the like).

Example 14—Implementations

Although the operations of some of the disclosed methods are described in a particular, sequential order for convenient presentation, it should be understood that this manner of description encompasses rearrangement, unless a particular ordering is required by specific language set forth. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 8, computer-readable storage media include memory 820 and 825, and storage 840. The term computer-readable storage media does not include signals and carrier waves. In addition, the term computer-readable storage media does not include communication connections (e.g., 870).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. It should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as HTML or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, implemented by one or more computing devices comprising at least one hardware processor and one or more tangible memories coupled to the at least one hardware processor, for executing an input command, the method comprising:
   receiving an input command;
   determining an intent for the input command;
   calculating a correlation score between the input command and the intent;
   storing the intent and the correlation score in a node of a command tree; and
   responsive to determining that the correlation score meets a threshold, providing the intent in the command tree for execution.

2. The method of claim 1, further comprising:
   storing the intent and the input command in association.

3. The method of claim 1, further comprising:
   detecting an input language for the input command; and
   wherein determining the intent for the input command is based on the detected input language.

4. The method of claim 1, wherein providing the intent comprises:
   translating the intent to an executable action for a target system; and
   sending a request to perform the executable action.

5. The method of claim 4, wherein the input command is received via an input channel, and, the method further comprises:
   receiving a response to the request to perform the executable actions; and
   providing the response via an output channel.

6. The method of claim 1, further comprising:
   responsive to determining that the correlation score meets a threshold, analyzing a timing of the intent against an intent history; and
   responsive to determining that the analysis of the timing meets a timing threshold, providing the intent for execution.

7. The method of claim 6, wherein analyzing a timing of the intent comprises deriving a new intent for a time-dependent command, and the new intent is provided for execution.

8. The method of claim 7, wherein the deriving is based on a user context as a reference.

9. The method of claim 7, wherein the deriving is based on a user group or world context as a reference.

10. A method, implemented by one or more computing devices comprising at least one hardware processor and one or more tangible memories coupled to the at least one hardware processor, for executing an input command, the method comprising:
   receiving a first input command;
   determining a first intent for the first input command;
   calculating a first correlation score between the first input command and the first intent;
   responsive to determining that the first correlation score meets a threshold, providing the first intent for execution;
   receiving a second input command;
   determining a second intent for the second input command;
   generating a command tree comprising the intent for the first input command in a first node and the second intent for the second input command;
   calculating a second correlation score between the second input command and the second intent;
   responsive to determining that the first correlation score meets a threshold, analyzing a sequence of the intents in the command tree against an intent map; and
   responsive to determining that the analysis of the sequence meets a sequence threshold, providing the second intent for execution.

11. One or more non-transitory computer-readable storage media storing computer-executable instructions for causing a computing system to perform a method for generating an executable command tree, the method comprising:
   receiving a series of input commands;
   parsing the series of input commands into separate command statements;
   identifying an interpreter node applicable to the series of input commands;
   generating a command tree based on the separate command statements, wherein generating the command tree comprises:
      determining an intent for a given command statement based on the interpreter node;
      calculating a confidence score for the intent and the given command statement;
      storing the intent and the confidence score in a node of the command tree;
      responsive to the confidence score, selecting another interpreter node; and
      generating the command tree based on the another interpreter node.

12. The one or more non-transitory computer-readable storage media of claim 11, wherein the interpreter node is applicable based on a user providing the input commands.

13. The one or more non-transitory computer-readable storage media of claim 11, wherein the interpreter node is applicable based on at least one of the separate command statements.

14. The one or more non-transitory computer-readable storage media of claim 11, further comprising:
   responsive to determining that the confidence scores meet a threshold, analyzing a sequence of the intents in the command tree against an intent map; and
   updating the confidence score based on the sequence analysis.

15. The one or more non-transitory computer-readable storage media of claim 11, further comprising:
   responsive to determining that the confidence scores meet a threshold, analyzing a timing of the intents in the command tree against an intent map history; and
   updating the confidence score based on the timing analysis.

16. A system for command translation, the system comprising:
one or more memories;
one or more processing units coupled to the one or more memories; and
one or more computer-readable storage media storing instructions that, when loaded into the one or more memories, cause the one or more processing units to perform command mapping operations comprising:
receiving a series of input commands;
parsing the series of input commands into separate command statements;
identifying an interpreter node applicable to the series of input commands from a plurality of interpreter nodes;
generating a command tree comprising the separate command statements stored in respective nodes;
performing a depth-first mapping of the command tree to intents based on the interpreter node, wherein the depth-first mapping comprises:
determining an intent for a given command statement based on the interpreter node, for the respective nodes of the command tree;
calculating a confidence score for the intent and the given command statement, for the respective nodes of the command tree;
storing the intent and the confidence score in a node of the command tree having the given command statement, for the respective nodes of the command tree; and
responsive to determining that the confidence score meets a threshold, providing one or more intents in the command tree.

17. The system of claim 16, further comprising:
responsive to determining that the confidence score meets a threshold, analyzing a sequence of the intents in the command tree against an intent map; and
responsive to determining that the analysis of the sequence meets a sequence threshold, providing the command tree.

18. The system of claim 16, further comprising:
responsive to determining that the confidence score meets a threshold, analyzing a timing of the intents in the command tree against an intent map history; and
responsive to determining that the analysis of the timing meets a timing threshold, providing the command tree.

19. The system of claim 16, further comprising:
responsive to determining that the confidence score fails the threshold, performing a breadth-first mapping of the command tree to intents based on a set of interpreter nodes from the plurality of interpreter nodes.

20. The system of claim 19, wherein the breadth-first analysis comprises analyzing the command tree against at least one interpreter node in the set of interpreter nodes to determine if an intent with a sufficient confidence score can be found, and responsive to determining that no intent is found, proceeding to analyze the command tree against another interpreter node in the set of interpreter nodes.

* * * * *